(12) United States Patent
Okubo

(10) Patent No.: US 7,088,366 B2
(45) Date of Patent: Aug. 8, 2006

(54) IMAGE GENERATION METHOD, PROGRAM, AND INFORMATION STORAGE MEDIUM

(75) Inventor: Takeshi Okubo, Kawasaki (JP)

(73) Assignee: Namco Bandai Games, Inc., Tokyo (JP)

( * ) Notice: Subject to any disclaimer, the term of this patent is extended or adjusted under 35 U.S.C. 154(b) by 392 days.

(21) Appl. No.: 10/206,038

(22) Filed: Jul. 29, 2002

(65) Prior Publication Data

US 2003/0022715 A1   Jan. 30, 2003

(30) Foreign Application Priority Data

Jul. 30, 2001   (JP) ............................. 2001-229466

(51) Int. Cl.
*G06T 13/00* (2006.01)

(52) U.S. Cl. ...................... 345/473; 345/474; 345/619; 345/621; 463/31

(58) Field of Classification Search ................ 345/619, 345/621, 473–475; 463/31
See application file for complete search history.

(56) References Cited

U.S. PATENT DOCUMENTS 6,949,024 B1 * 9/2005 Kaku et al. .................... 463/31

OTHER PUBLICATIONS

Maciej Kalisiak, A Grasp-based Motion planning Algorithm for Intelligent Character Animation, Universit of Toronto, Master Thesis, 1999.*

* cited by examiner

*Primary Examiner*—Kimbinh T. Nguyen
(74) *Attorney, Agent, or Firm*—Oliff & Berridge, PLC

(57) ABSTRACT

The shape of a model object specified by a motion processing is changed depending on the shape of a landform so that at least one (foot or hand) of part objects forming the model object does not sink under the surface of the landform. The model object is disposed at a height in which any part object to be located on a lower surface of the landform is in contact with the surface of the landform. When any other part object sinks under the surface of the landform due to such a disposition, the shape of the model object is changed by the inverse kinematics so that the other part object is brought into contact with the surface of the landform. When the model object is in its jumping state, a judgment point for determining a disposing height of the model object is fixed at the representative point in the model object. The jumping orbit is changed depending on the height of the landform by changing the disposing height of the model object depending on the height of the landform at the position of the representative point.

20 Claims, 19 Drawing Sheets

IMAGE GENERATION METHOD, PROGRAM, AND INFORMATION STORAGE MEDIUM

Japanese patent application no. 2001-229466 filed on Jul. 30, 2001 is hereby incorporated by reference in its entirety.

BACKGROUND OF THE INVENTION

The present invention relates to a method, program and information storage medium for image generation.

There is known an image generating system (or game system) for generating an image visible from a virtual camera (or a given viewpoint) in an object space which is a virtually three-dimensional space. Such an image generating system is highly popular as one that provides a so-called virtual reality. For example, in an image generating system for playing a fighting game, a player uses a game controller to control its own character (or model object) such that it will fight with an enemy character controlled by another player or a computer.

In such a fighting game according to the prior art, it is general that a player's character fights with an enemy character on a flat landform (or ground). Therefore, an image generated could not but being poorer in reality since it would not be influenced by any uneven landform.

Furthermore, such a type of fighting game represents the motion of a character relating to its hands and legs by reproducing previously prepared motions. For example, if a player performs a control of forward stepping its own character, motions previously prepared for forward walks will be reproduced. If the player performs another control of jumping its own character, motions previously provided for jumps will be reproduced.

Where the motion of a character is to be represented only by reproducing previously prepared motions as mentioned above, however, the character may have unnatural motions different from those of the real world. Particularly, if a character is to be moved on an uneven landform, it has been found that a problem was raised in that the legs of the character would sink under the ground.

BRIEF SUMMARY OF THE INVENTION

One aspect of the present invention relates to a method of generating an image, comprising:

performing a motion processing which causes a model object to perform a motion, the model object being formed of part objects;

changing a shape of the model object specified by the motion processing depending on a shape of an uneven landform to prevent at least one of the part objects from sinking under a surface of the landform; and generating an image within an object space at a given viewpoint.

Another aspect of the present invention relates to a method of generating an image, comprising:

changing a disposing height of a model object depending on a height of a landform;

performing a motion processing which causes the model object to perform a motion;

generating an image within an object space at a given viewpoint; and changing an orbit of air movement depending on the height of the landform at a position of the model object even when the model object is in an air moving state.

Still another aspect of the present invention relates to a method of generating an image, comprising:

changing a disposing height of a model object depending on a height of a landform;

performing a motion processing which causes the model object to perform a motion;

generating an image within an object space at a given viewpoint;

changing the disposing height of the model object depending on the height of the landform at a position in which a part object is disposed when the model object is in a normal moving state in which the model object is moving with a part object in contact with a surface of the landform; and fixing a judgment point for determining the disposing height of the model object at a representative point of the model object when the model object is in an air moving state, and changing the disposing height of the model object depending on the height of the landform at a position of the representative point.

DETAILED DESCRIPTION OF THE EMBODIMENT

Figure 1:
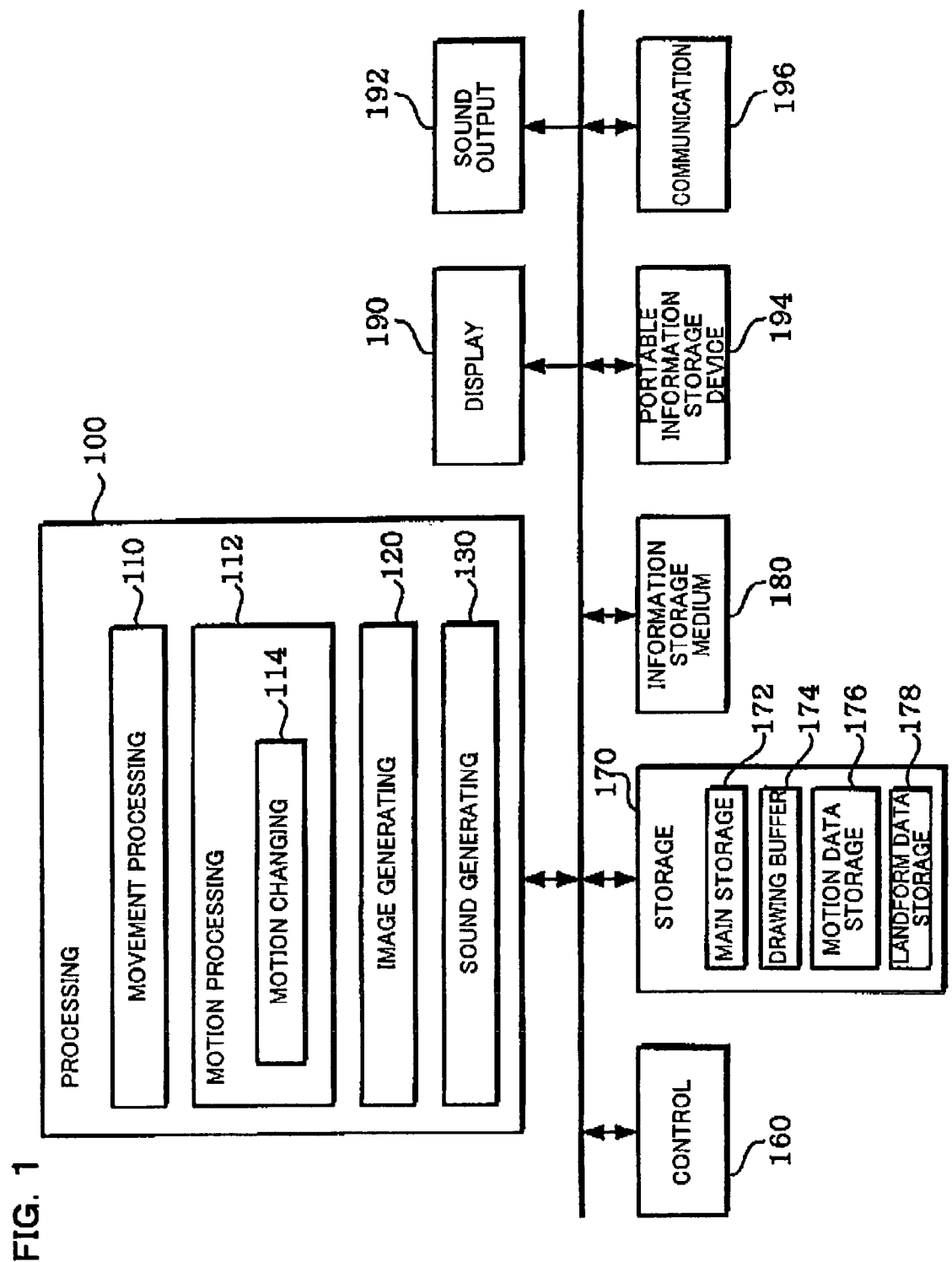
FIG. 1 is a functional block diagram of an image generating system according to this embodiment.

Embodiments of the present invention will now be described.

Note that the embodiments described hereunder do not in any way limit the scope of the invention defined by the claims laid out herein. Note also that all of the elements of these embodiments should not be taken as essential requirements to the means of the present invention.

One embodiment of the present invention provides a method of generating an image, comprising:

performing a motion processing which causes a model object to perform a motion, the model object being formed of part objects;

changing a shape of the model object specified by the motion processing depending on a shape of an uneven landform to prevent at least one of the part objects from sinking under a surface of the landform; and generating an image within an object space at a given viewpoint.

According to this embodiment, the shape of the model object (a basic shape or a shape at each frame) is specified by the motion processing (motion play or motion generation). This specified shape of the model object is changed (or the motion is changed) depending on the shape of the landform (landform data) so that the part object does not sink under the surface of the landform. According to this embodiment, therefore, the shape of the model object can be changed to fit in the shape of the landform while causing the model object to perform its motion through the motion processing. Thus, an image of the model object to which the shape of the landform is reflected can be generated.

In the image generating method program and information storage medium according to one embodiment of the present invention, the model object may be disposed at such a height that one part object to be located on a lower surface of the landform among the part objects is in contact with the surface of the landform, and the shape of the model object maybe changed so that another of the part objects is brought into contact with the surface of the landform when the other of the part objects sinks under the surface of the landform due to the disposition.

Thus, a part object to be disposed on (or directly above) a surface of the landform lower than the position of another part object can be in contact with the surface of the landform while the other part object to be disposed at a higher surface being prevented from sinking under the surface of the landform. Thus, such a situation that the other part object disposed at the higher surface of the landform does not contact with the surface of the landform can be avoided thereby generating a more natural and consistent image.

In the image generating method, program and information storage medium according to one embodiment of the present invention, furthermore, candidate part objects may be selected among the part objects within a given range of height from a part object located at the lowest position in the shape of the model object specified by the motion processing, and the model object may be disposed at such a height that one of the selected candidate part objects to be located on a lowest surface of the landform is in contact with the surface of the landform.

Thus, such a situation that any part object which should not be brought into contact with the surface of the landform will undesirably contact the landform can be prevented.

In the image generating method, program and information storage medium according to one embodiment of the present invention, a disposing height of the model object maybe changed depending on a height of the landform, and an orbit of air movement may be changed depending on the height of the landform at a position of the model object even when the model object is in an air moving state.

Thus, the model object moving in an air moving state (in jumping state, attacked and jumping state or falling state) can land the surface of the landform through an appropriate landing motion.

In the image generating method, program and information storage medium according to one embodiment of the present invention, a disposing height of the model object may be changed depending on a height of the landform, the disposing height of the model object may be changed depending on the height of the landform at a position in which a part object is disposed when the model object is in a normal moving state in which the model object is moving with the part object in contact with a surface of the landform, and a judgment point for determining the disposing height of the model object may be fixed at a representative point of the model object when the model object is in an air moving state, and changing the disposing height of the model object depending on the height of the landform at a position of the representative point.

Thus, such a situation that the position of the judgment point for determining the level of the model object (or a point at which the landform data is read out from a landform-data storing section) is frequently changed can be avoided. This can simplify the process.

In the image generating method, program and information storage medium according to one embodiment of the present invention, a disposing height of the model object may be changed depending on a height of the landform, and the disposing height of the model object may be changed with a rate of change lower than a rate of change for height of the landform.

Thus, such a situation that if the height of the landform suddenly varies, the level of the model object correspondingly changes suddenly can be avoided. Consequently, the model object can smoothly be moved on the surface of an uneven landform.

In the image generating method, program and information storage medium according to one embodiment of the present invention, the model object may be a character in a game, a disposing height of the model object may be changed depending on a height of the landform, and the disposing height of the model object may be increased so that a hip part object of the model object is brought into contact with the surface of the landform when the model object is disposed at a height obtained based on the height of the landform and the hip part object sinks under the surface of the landform.

Thus, such a situation that the hip part object sinks under the surface of the landform can be avoided, for example, if the model object or character lies on the surface of the landform.

In the image generating method, program and information storage medium according to one embodiment of the present invention, the shape of the model object may be changed so that a height of the part objects other than the hip part object are lower than a height of the hip part object.

Thus, the shape of the model object may be changed to fit in the shape of the landform surface, for example, if the model object or character lies on the surface of the landform.

Another embodiment of the present invention provides a method of generating an image, comprising:

changing a disposing height of a model object depending on a height of a landform;

performing a motion processing which causes the model object to perform a motion;

generating an image within an object space at a given viewpoint; and changing an orbit of air movement depending on the height of the landform at a position of the model object even when the model object is in an air moving state.

According to this embodiment, the model object may be moved in the air while causing the model object to perform motions through the motion processing. In addition, the model object in the air moving state can be caused to land on the surface of the landform with an appropriate landing motion. This enables a more realistic and natural image to be generated.

A further embodiment of the present invention provides a method of generating an image, comprising:

changing a disposing height of a model object depending on a height of a landform;

performing a motion processing which causes the model object to perform a motion;

generating an image within an object space at a given viewpoint;

changing the disposing height of the model object depending on the height of the landform at a position in which a part object is disposed when the model object is in a normal moving state in which the model object is moving with the part object in contact with a surface of the landform; and fixing a judgment point for determining the disposing height of the model object at a representative point of the model object when the model object is in an air moving state, and changing the disposing height of the model object depending on the height of the landform at a position of the representative point.

According to this embodiment, the level of the model object can be determined depending on the height of the landform at a position in which a part object (a part object to be first landed on the surface of the landform or a part object disposed at a lower height of the landform) is disposed when the model object is in its normal moving state.

On the other hand, the judgment point for determining the level of the model object is fixed at the representative point of the object when the model object is in an air moving state (or when none of the part objects is in contact with the surface of the landform for a certain time period). The level of the model object is determined depending on the height of the landform at the position of or just below the representative point providing the judgment point. Thus, such a situation that the position of the judgment point frequently changes can be avoided. At the same time, the level of the object (or the orbit in the air moving state) can be changed depending on the height of the landform at the position of or just below the representative point.

This embodiment will now be described in detail with reference to the drawing.

1. Configuration

FIG. 1 shows a block diagram of an image generating system (or game system) according to this embodiment. In this figure, this embodiment may comprise at least a processing unit 100 (or a processing unit 100 with a storage unit 170). Each of the other blocks may take any suitable form.

A control unit 160 is used to input operational data from the player and the function thereof may be realized through any suitable hardware means such as a lever, a button, a housing or the like.

The storage unit 170 provides a working area for the processing unit 100, communication unit 196 and others. The function thereof may be realized by any suitable hardware means such as RAM or the like.

An information storage medium (which may be a computer-readable storage medium) 180 is designed to store information including programs, data and others. The function thereof maybe realized through any suitable hardware means such as optical memory disk (CD or DVD), magneto-optical disk (MO), magnetic disk, hard disk magnetic tape, memory (ROM) or the like. The processing unit 100 performs various processings in the present invention (or this embodiment) based on a program (or data) that has been stored in this information storage medium 180. In other words, the information storage medium 180 stores (or records) a program for causing a computer to function as the respective sections of the present invention (or this embodiment) which are particularly represented by the blocks included in the processing unit 100. Namely, it can be the that such a program causes the computer to realize the respective processings.

Part or the whole of the information stored in the information storage medium 180 will be transferred to the storage unit 170 when the system is initially powered on. The information storage medium 180 may contain programs, image data, sound data, display data and the like usable for performing the processings in the present invention.

A display unit 190 is to output an image generated according to this embodiment and the function thereof can be realized by any suitable hardware means such as CRT, LCD or HMD (Head-Mount Display).

A sound output unit 192 is to output a sound generated according to this embodiment and the function thereof can be realized by any suitable hardware means such as speaker.

A portable information storage device 194 is to store the player's personal data and save data and may be take any suitable form such as memory card or portable game machine.

A communication unit 196 is designed to perform various controls for communication between the image generating system of the present invention and any external device (e.g., host device or other image generating system). The function thereof may be realized through any suitable hardware means such as various types of processors or communication ASIS or according to any suitable program.

The program or data for causing the computer to realize the respective processings in the present invention (or this embodiment) may be delivered from an information storage medium included in a host device (or server) to the information storage medium 180 through a network and the communication unit 196. The use of such an information storage medium in the hose device (or server) falls within the scope of the invention.

The processing unit (processor) 100 is to perform various processings such as game processing, image generating or sound generating, based on the control data or program from the control unit 160. In such a case, the processing unit 100 will execute the respective processings using a main storing section 172 within the storage unit 170.

The processing unit 100 may be designed to perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space hit checking, computation of the game results (or scores), processing for causing a plurality of players to play in a common game space and various other game processings including game-over.

The processing unit 100 comprises a movement processing section 110, a motion processing section 112, an image generating section 120 and a sound generating section 130. However, the processing unit 100 does not necessarily include all of these functional blocks.

The movement processing section 110 is to control the movement of a model object (or movable object such as character, robot, motorcar or tank).

More specifically, the movement processing section 110 functions to move (or translate and rotate) the model object in an object space (or game space). This movement processing of the model object can be realized by determining the position and rotation angle of the model object in the present frame (inter), based on the operational data from the control unit 160 (or input data from a player) and the position and rotation angle (or orientation) of the model object in the previous frame (1/60 seconds or 1/30 seconds). For example, it is now assumed that the position and rotation angle of the model object are respectively Pk−1 and θk−1 in a frame (k−1) and that the amounts of positional and rotational changes (or linear velocity and rotational velocity) in the model object through one frame are respectively ΔP and Δθ. Thus, the position Pk and rotation angle θk of the model object in a frame (k) may be determined by the following formulas:

$$Pk = Pk-1 + \Delta P \quad (1)$$

$$\theta k = k-1 + \Delta\theta \quad (2)$$

The motion processing section 112 performs a processing (including motion play and motion generation) for causing the model object (character) to execute a motion (or animation). This motion processing of the model object can be realized by reproducing the motion of the model object, based on motion data which has been stored in a motion data storage section 176.

More particularly, the motion data storage section 176 has previously stored motion data relating to the position or rotation angle of each of part objects which form the model object (skeleton), the part objects corresponding to bones forming the skeleton. The motion processing section 112 reads out this motion data and then reproduces the motion of the model object by moving the respective part objects (or bones) forming the model object or changing the skeleton shape of the model object, based on the read motion data.

The motion data stored in the motion data storage section 176 is desirably prepared by capturing the motion of a person with sensors in the real world, but may be generated in real time by a physical simulation (or a simulation utilizing physical calculations or physical pseudo-calculation).

To reproduce a realistic motion with less amount of data motion, it is desirable that the motion play is performed using the motion interpolation or inverse kinematics.

This embodiment provides an uneven surface of a landform (ground or building or game field) that is a field surface on which the model object (character) moves. A landform data storage section 178 has previously stored landform data (which, in a narrow sense, is height data) for specifying the shapes of landforms (including artificial landforms such as buildings).

Thus, this embodiment performs the movement and motion processings of the model object, based on the landform data stored in the landform data storage section 178.

More particularly, a point of judgment (or center of gravity) for determining the disposing height of the model object is set for each of the objects. Such a point of judgment may be the position of a part object (articulation) to be located on a lower surface of the landform among the part objects forming the model object or the representative point of the model object (or a point representatively representing the position of the model object).

In this embodiment, the height data (or Y-coordinate in the world coordinate system) of the landform at the position of this point of judgment (or X- and Z-coordinates in the world coordinate system) will be read out from the landform data storage section 178. The model object is disposed at a height specified by this height data (or height offset). Thus, the disposing height of the model object disposed can be changed depending on the height of the landform, thereby moving the model object along the shape of the landform surface.

In this embodiment, a motion changing portion 114 included in the motion processing section 112 performs a processing of changing the shape of the model object (skeleton).

More particularly, the shape of the model object specified by the motion processing (including motion play and motion generation) or the basic shape specified by the motion data is changed depending on the shape of the landform such that the part objects (bones and articulations) forming the model object will not sink (or be embedded) under the surface of the landform (ground or game field). In other words, the model object is disposed at such a height that a part object (e.g., left-shin part object) among the part objects forming the model object (feet, shins, hands, arms, neck, chest and hip) contacts a lower surface (in Y-coordinate) of the landform at a position (in K- and Z-coordinates) wherein that part object is disposed. In such a disposition, if another part object (e.g., right-shin part object) sinks under the surface of the landform, the shape of the model object will be changed such that the other part objects are brought into contact with the surface of the landform, for example, using the known inverse kinematics technique.

It is now assumed that if a model object (or its representative point) of a shape specified by motion data is temporarily disposed within an object space, for example, at a position wherein the X- and Z-coordinates thereof are specified by an operational data while the Y-coordinate thereof is at a predetermined value (zero), the surface of the landform has its lowest height at a position (in X- and Z-coordinates) wherein the left-foot part object of the model object is located. In such a case, the model object will be disposed at such a height that this left-foot (or left-ankle) part object is in contact with the surface of the landform. If the right-foot part object sinks under the surface of the landform in such a disposition, the shape of the model object is changed such that the right-foot part object is brought into contact with the surface of the landform. Namely, the related parts of the model object such as right-knee and so on are changed through the inverse kinematics.

Thus, the motion of the model object (which is specified by the motion data) will be changed depending on the shape of the landform surface. This can provide a more realistic image.

The image generating section 120 generates and outputs a game picture through the display unit 190 by performing the image processing based on various results of processing in the processing unit 100. For example, if a so-called three-dimensional game image is to be generated, a geometry processing such as coordinate transformation, clipping, perspective transformation or light-source calculation is performed. The result thereof is used to prepare a drawing data including position coordinates, texture coordinates, color (brightness) data, normal vector or α-value all of which are given to the vertex (or constitutive point) of a primitive surface. Based on the resulting drawing data (or primitive surface data), the image of an object (which is formed by one or more primitive surfaces) subjected to the geometry processing is then drawn in a drawing buffer 174 (which is a buffer for storing the image information by pixel unit, such as frame buffer or work buffer). Thus, an image visible from a virtual camera (or a given viewpoint) within the object space will be generated.

The sound generating section 130 generates and outputs a game sound such as BGM, effect sound or voice through a sound output unit 192 by performing the sound processing based on various results of processing in the processing unit 100.

The image generating system of this embodiment may be dedicated for a single-player mode in which only a single player can play the game or may have a multi-player mode in which a plurality of players can play the game.

If a plurality of players play the game, game images and sounds to be provided to all the players may be generated by only a single terminal or by a plurality of terminals (game machines or mobile telephones) interconnected through a network (transmission lien or communication line).

2. Features of this Embodiment

The features of this embodiment will now be described with respect to the drawing. Although they will mainly be described in connection with a fighting game to which this embodiment is applied, this embodiment may broadly be applied to any of various games other than the fighting game.

2.1 Change of Motion Dependent on the Shape of a Landform

Figure 2:
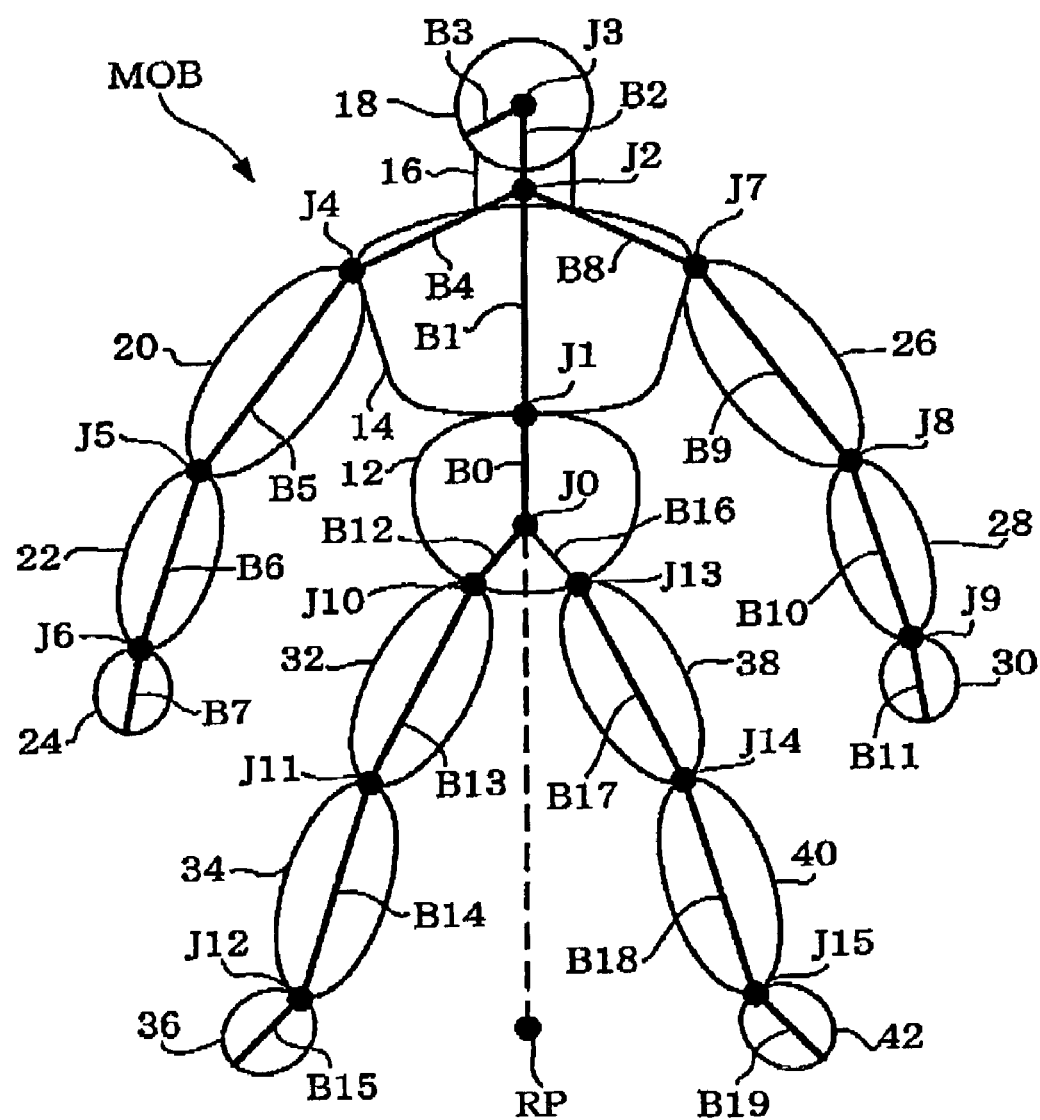
FIG. 2 is a view illustrating a model object formed by a plurality of part objects.

In this embodiment, as shown in FIG. 2, a model object MOB (or character) is formed by a plurality of part objects such as hip 12, breast 14, neck 16, head 18, right brachium 20, right forearm 22, right hand 24, left brachium 26, left forearm 28, left hand 30, tight thigh 32, right shin 34, right foot 36, left thigh 368 left shin 40 and left foot 36. The position and rotation angle (or direction) of each of these part objects (locations) is specified by the position of the corresponding one of articulations J0 to J15 and the rotation angle of the corresponding one of bones B0 to B19 (which is a relative rotation angle between parent and child bones), these articulations and bones forming the skeleton model. These articulations and bones are virtual, but will not be shown in any object displayed.

In this embodiment, the part objects (including bones and articulations) forming the model object MOB are in parent-child relationship (or hierarchical structure). For example, each of the forearms 22 and 28 is a parent for the corresponding one of the hands 24 and 30. Each of the brachia 20 and 26 is a parent for the corresponding one of the forearms 22 and 28. The breast 14 is a parent for the brachia 20 and 26. The hip 12 is a parent for the breast 14. Each of the shins 34 and 40 is a parent for the corresponding one of the feet 36 and 42. Each of the thighs 32 and 38 is a parent for the corresponding one of the shins 34 and 40. The hip 12 is a parent for the thighs 32 and 38.

The motion data storage section 176 has stored the positions and rotation angles of these part objects (including the articulations and bones) as motion data. For example, it is now assumed that a walk motion is formed by basic motions MP0, MP1, MP2 . . . MPN (which are motions in the respective frames). The position and rotation angle of each of the part objects in each of these basic motions MP0, MP1, MP2 . . . MPN has previously been stored as motion data. For example, the motion may be reproduced by reading out the motion data in each of the basic motions sequentially through time passage, or by reading out the position and rotation angle of each of the part objects in the basic motion MP0 and then reading out the position and rotation angle of each of the part objects in the other basic motion MP1, for example.

The motion data stored in the motion data storage section 176 is generally prepared by capturing the actual motions or by a designer. The position and rotation angle of each of the part objects (including the articulations and bones) are represented by the relative position and rotation angle (around three axes) to the position and rotation angle of the corresponding parent part object.

Symbol RP in FIG. 2 is the representative point in the model object MOB. The representative point RP may be set at a position directly below the hip (J0) (or a position having zero height), for example.

According to this embodiment, the motion of the model object is changed depending on the shape of the landform (including any artificial landform such as building) such that any part object in the model object will not sink under the surface of the landform (or game field).

Figure 3A:
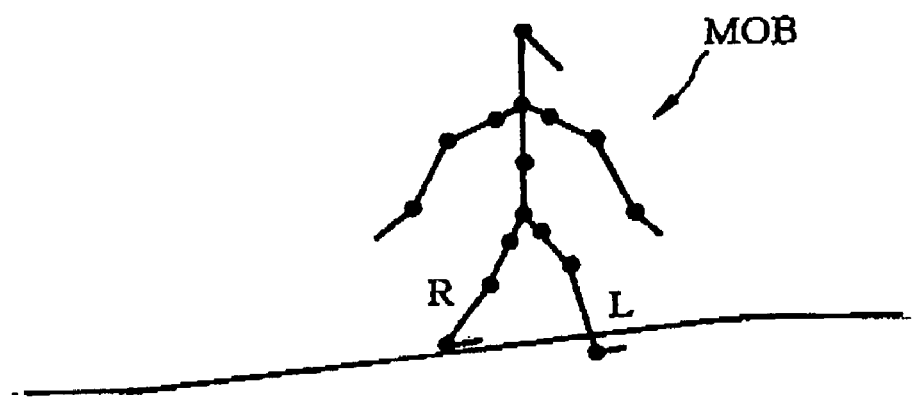
FIGS. 3A and 3B are views illustrating a technique of changing the shape of a model object depending on the shape of an uneven landform.

For example, in FIG. 3, the left-foot part object of the model object MOB sinks under the surface of the landform. The motion data is so selected that no inconsistency will occur as the model object moves a flat surface of the landform. If the motion data is reproduced on such a tilted surface of the landform as shown in FIG. 3A, part of the foot part object in the model object MOB will sink under the surface of the landform.

One of the techniques for overcoming such a problem is to separately provide two motions for flat and tilted surfaces. However, such a technique vastly increases the amount of motion data to be processed. This raises another problem in that the capacity of the memory used is wasted.

According to this embodiment, the shape of the model object MOB is changed such that any part object will not sink under the surface of the landform. More particularly, the positions and rotation angles of the left foot, shin and thigh are changed (through the inverse kinematics technique) such that the left foot part object is brought into contact with the surface of the landform, rather than under the shape of the landform. Thus, an image having both the feet thereof contacting the surface of the landform with consistency can be generated with less data and processing load.

2.2 Part Object in Contact with a Lower Surface of the Landform

Figure 3B:
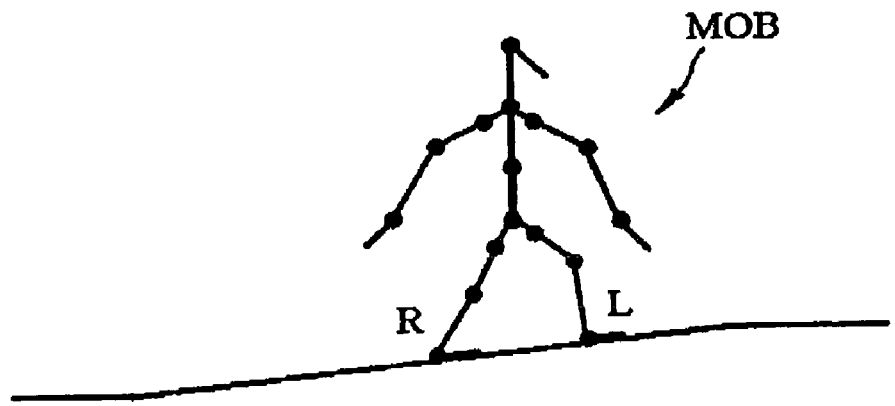

To generate such a consistent image as shown in FIG. 3B, this embodiment takes a technique of changing the shape of the model object such that a part object is first brought into contact with a lower surface of the landform (or game field) and another part object is then brought into contact with a higher surface of the landform.

Figure 4A:
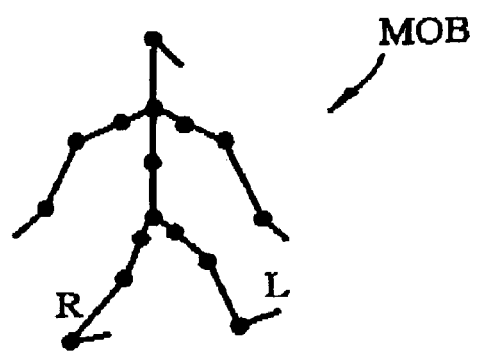
FIGS. 4A, 4B, 4C and 4D are views illustrating a technique of changing the level of a model object such that the part objects thereof will be brought into contact with the surface of a landform having a smaller height at a position wherein the part objects are disposed and changing the shape of the model object such that the part objects thereof will be brought into contact with the surface of the landform having a larger height at a position wherein the part objects are disposed.
Figure 4B:
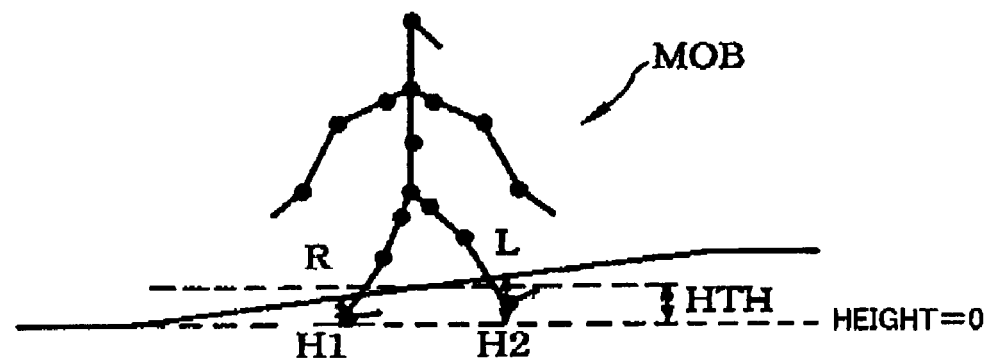

More particularly, a model object MOB having a shape specified by a motion data (or basic motion) in the present frame as shown in FIG. 4A is temporarily disposed at a position wherein a height (in Y-coordinate or the second coordinate on the second axis along the direction of height) becomes equal to zero (or a predetermined value) as shown in FIG. 4B. In this case, X- and Z-coordinates (or the first and third coordinates respectively on the first and third axes perpendicular to the second axis) at the position of the model object MOB are specified by the position of the model object MOB in the previous frame as well as the operational data inputted by a player through the control unit.

Figure 4C:
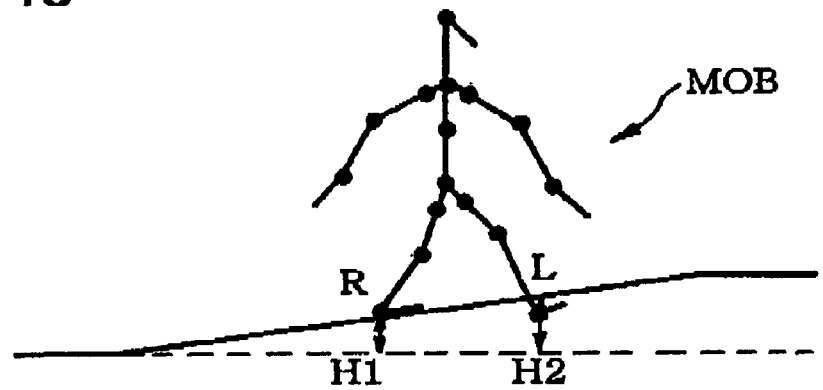

Next, the disposing height of the model object MOB is changed such that a part object (e.g., right foot) among the part objects (including the articulations) forming the model object MOB is brought into contact with a lower surface of the landform at a height (in Y-coordinate) directly below the position of that part object (in X- and Z-coordinates) as shown in FIG. 4C. In other words, the model object MOB is upward moved at such a height offset (H1) that that part object (right foot) is in contact with the surface of the landform.

Figure 4D:
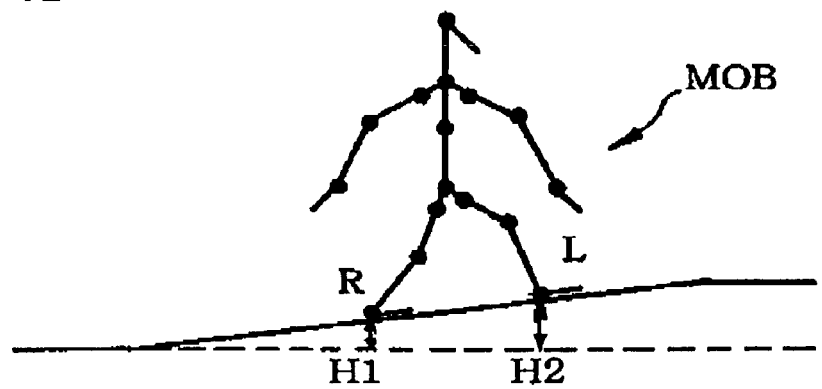

If another part object (left foot) in non-contact with the surface of the landform occurs through such a change of height (or upward movement), the shape of a portion of the model object MOB (left shin) is changed through the inverse kinematics such that that part object (left foot) will be brought into contact with the surface of the landform as shown in FIG. 4D. Thus, a consistent and natural image can be generated as shown in FIG. 4D.

Figure 5A:
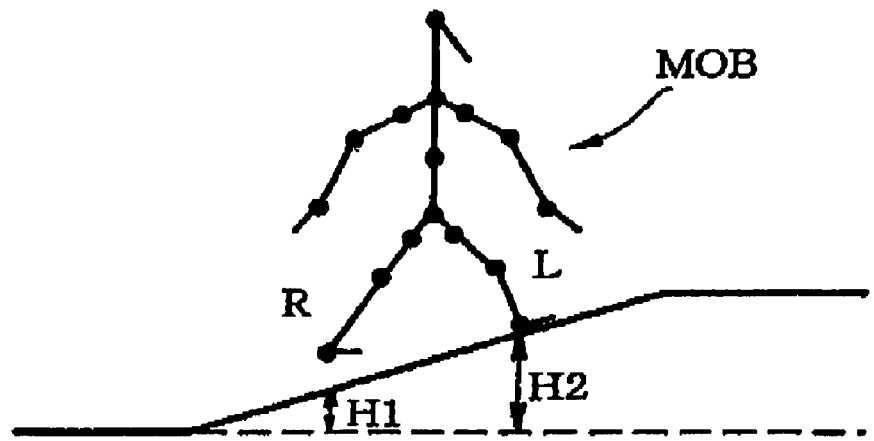
FIGS. 5A, 5B and 5C are views illustrating problems and so on in a technique different from that of FIGS. 4A to 4D.

If a part object (left foot) is first brought into contact with a higher surface of the landform at a larger height (H2) as shown in FIG. 5A, there will occur such a situation that another part object (right foot) cannot be brought into contact with a lower surface of the landform at a smaller height (H1) even through the inverse kinematics or such a situation that the shape of a portion of the model object MOB (or the entire right leg) is completely extended in an unnatural manner.

According to this embodiment, the change of the shape is performed such that one the part objects (right foot) to be located on a lower surface of the landform (H1) is first brought into contact with the surface of the landform and the other part object (left foot) to be located on a higher surface of the landform (H2) is then brought into contact with the surface of the landform, as shown in FIG. 4C. Therefore, the part object (left foot) to be located on the higher surface of the landform (H2) will be able to surely contact the surface of the landform through the inverse kinematics, as shown in FIG. 4D. At the same time, there can be avoided such a situation that a portion of the model object MOB will completely extend.

Furthermore, this embodiment selects part objects (right and left feet) within a given range of height (0 to HTH) from part objects (right feet) in the lowest position of the shape (FIG. 4A) of the model object MOB specified by the motion processing (or motion data) as candidate part objects (FIG. 4B). The model object MOB is then disposed such a height that one of the selected candidate part objects (right and left feet) to be located on the lowest surface of the landform (which in this case, is right foot) is brought into contact with the surface of the landform (FIG. 4C).

Figure 5B:
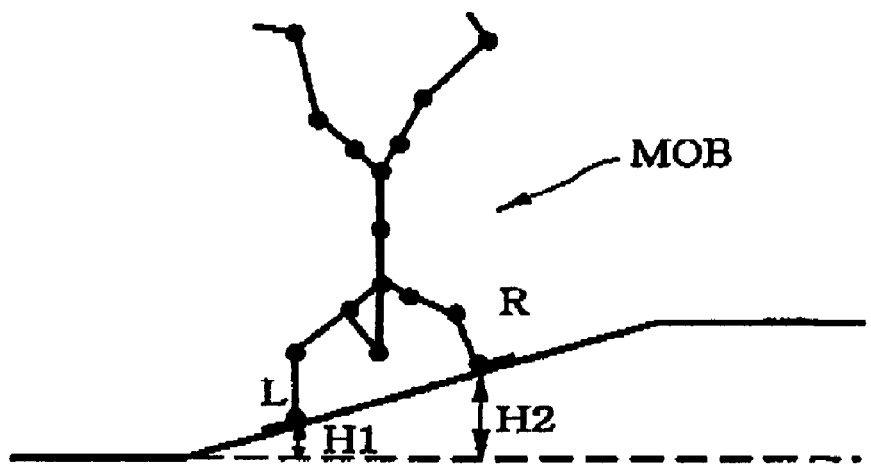

By taking such a technique, any part object to be located on a lower surface of the landform (e.g., hand) can surely be brought into contact with the surface of the landform, for example, even though the model object MOB is in its handstand or lying position as shown in FIG. 5B. Furthermore, such a situation that a part object to be located at a higher position and not to be brought into contact the surface of the landform will be brought into contact the surface of the landform as shown in FIG. 5C can be avoided.

Figure 5C:
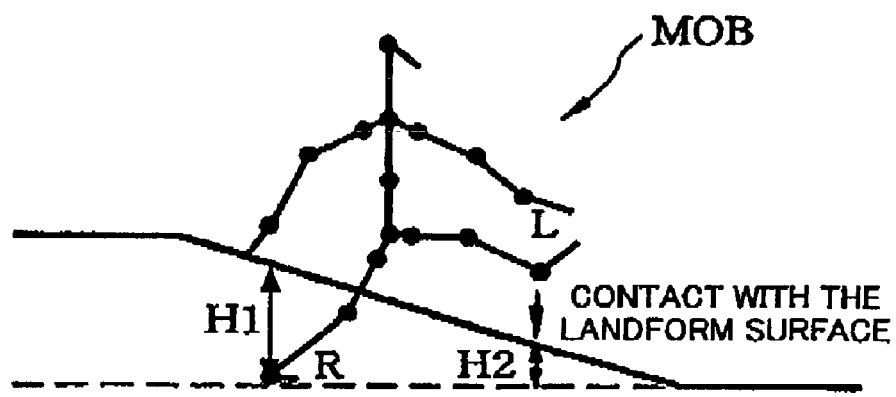

More particularly, the model object MOB shown in FIG. 5C is in a kick motion wherein it kicks up the left foot part object thereof without bringing into contact with the surface of the landform. On the other hand, the height (H2) of the landform whereat the left foot part object is disposed is lower than the height (H1) of the landform whereat the right foot part object is disposed. If such a technique of merely bringing one of the part objects to be located on the lower surface of the landform into contact with the surface of the landform is taken in the aforementioned situation, there will occur such an undesirable or unnatural situation that the left foot part object will be brought into contact with the surface of the landform while kicking up the same left foot part object.

According to this embodiment, only one of the lowest right foot part objects within a given range of height (0 to HTH) is selected as a candidate part object to be first brought into contact with the surface of the landform, as shown in FIG. 4B. Therefore, the left foot part object of FIG. 5C which is apparently to be located higher and not to be brought into contact with the surface of the landform will not be selected. As a result, such a situation that this left foot part object will undesirably be brought into contact with the surface of the landform can be avoided.

Figure 6A:
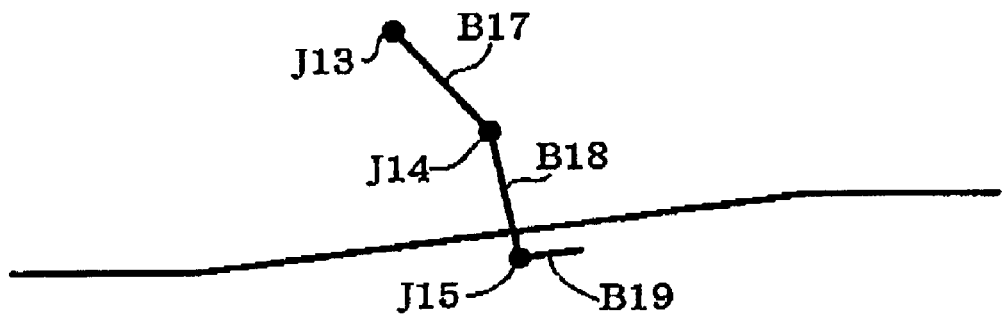
FIGS. 6A and 6B are views illustrating the inverse kinematics.
Figure 6B:
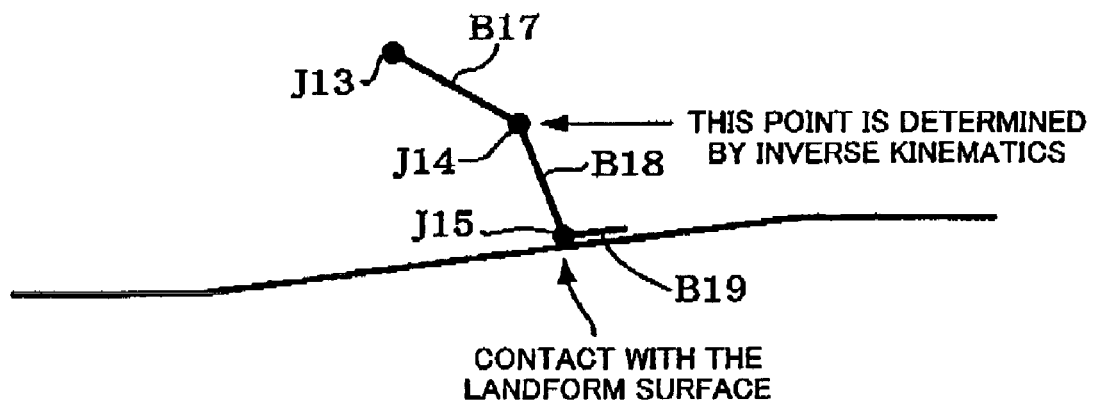

According to this embodiment, the shape of the model object MOB (or the entire left leg) is changed through the inverse kinematics when the part object (left foot) to be located on the higher surface of the landform is to be brought into contact with the surface of the landform, as shown in FIGS. 6A and 6B.

More particularly, part objects (articulation J15 and bone B19) to be located on a higher surface of the landform are first brought into contact with the surface of the landform (or upward moved). The position of an articulation J14 (knee) is then determined based on the position of the articulation J15 (ankle) after brought into contact with the surface of the landform, the position of an articulation J13 (hip joint) specified by the motion data and the policy data contained in the motion data (which policy data is used to uniformly specify a plane including bones B17 and B18). Thus, the orientation of the plane including the bones B17 and B18 will not be changed even after the shape of the model object has been changed. This enables a more natural change of shape to be realized.

Alternatively, the shape of the model object may be changed through the inverse kinematics technique such that the positions of the articulations J13, J14 and the rotation angles (directions) of the bones B17, B18 will be minimized in change.

FIGS. 7A to 11B show various game pictures generated according to this embodiment.

Figure 7A:
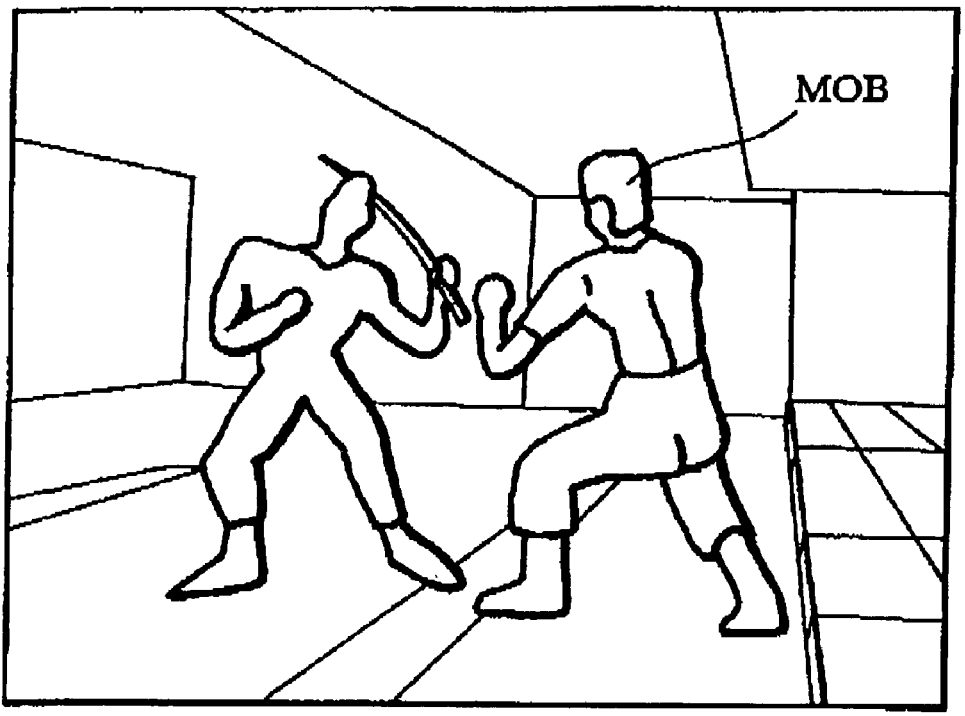
FIGS. 7A and 7B show a game picture generated in accordance with this embodiment.
Figure 7B:
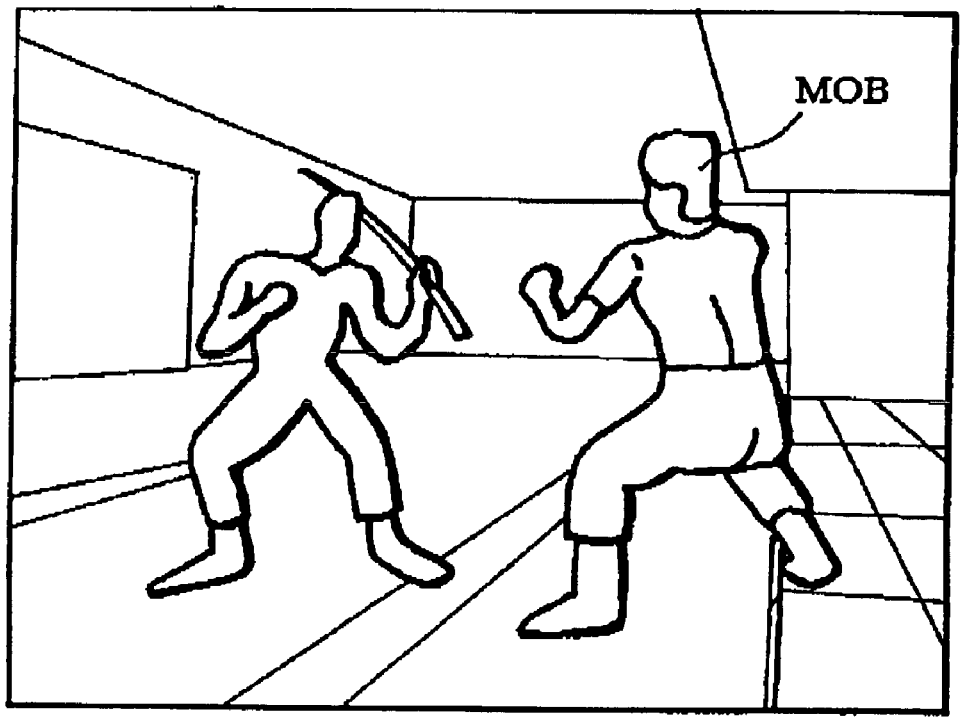
Figure 8A:
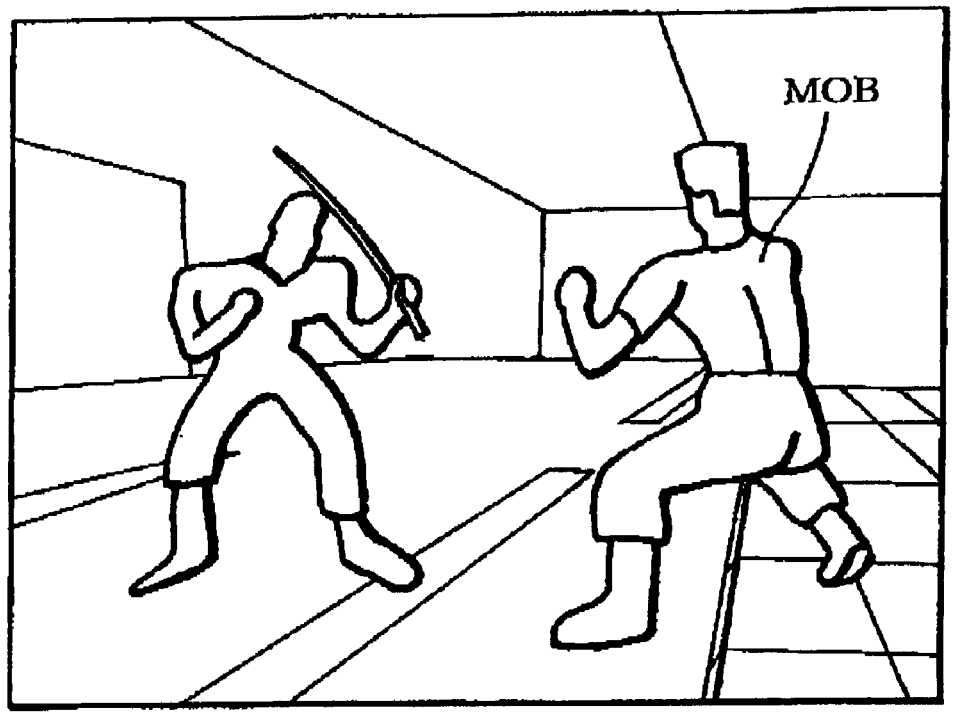
FIGS. 8A and 8B show another game picture generated in accordance with this embodiment.
Figure 8B:
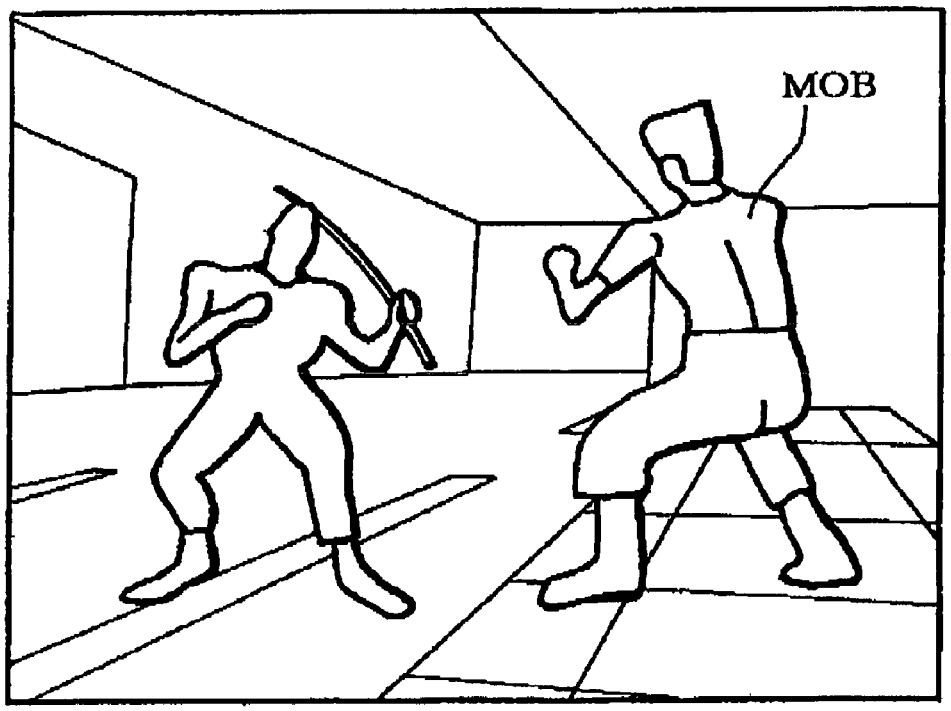

FIG. 7A shows a game picture wherein a model object MOB stands on a flat landform surface. FIG. 7B shows another game picture wherein the model object MOB has its right foot placed on a raised step. FIG. 8A shows still another game picture wherein the model object MOB further backstepped from the position of FIG. 7B. FIG. 8B shows a further game picture wherein both the feet of the model object MOB are placed on the raised step.

Figure 9A:
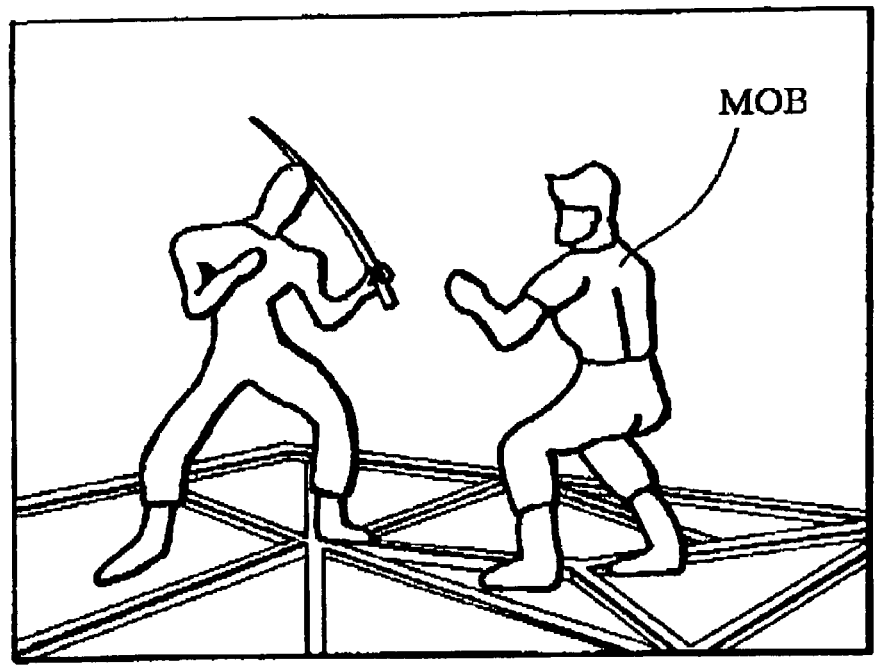
FIGS. 9A and 9B show still another game picture generated in accordance with this embodiment.
Figure 9B:
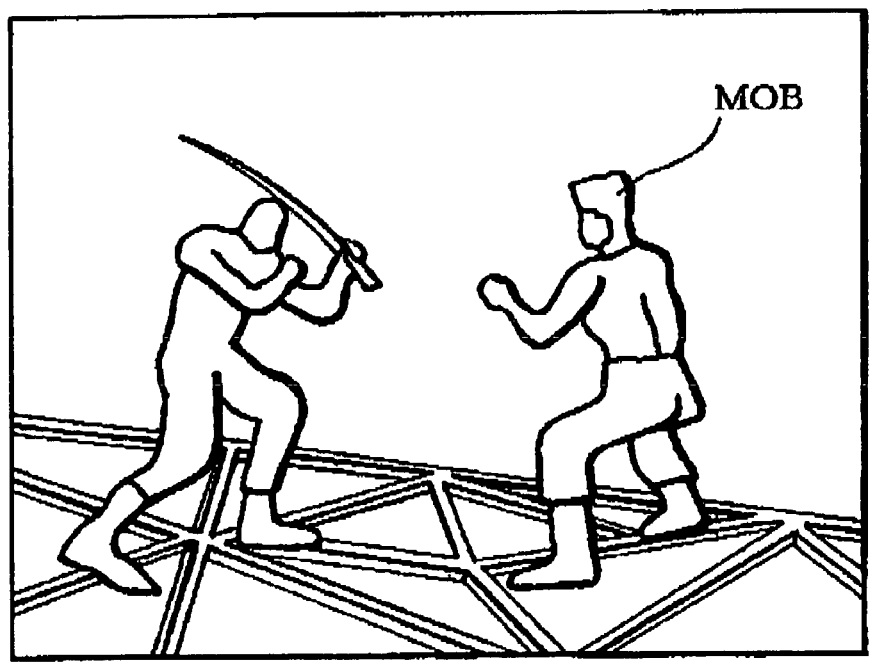
Figure 10A:
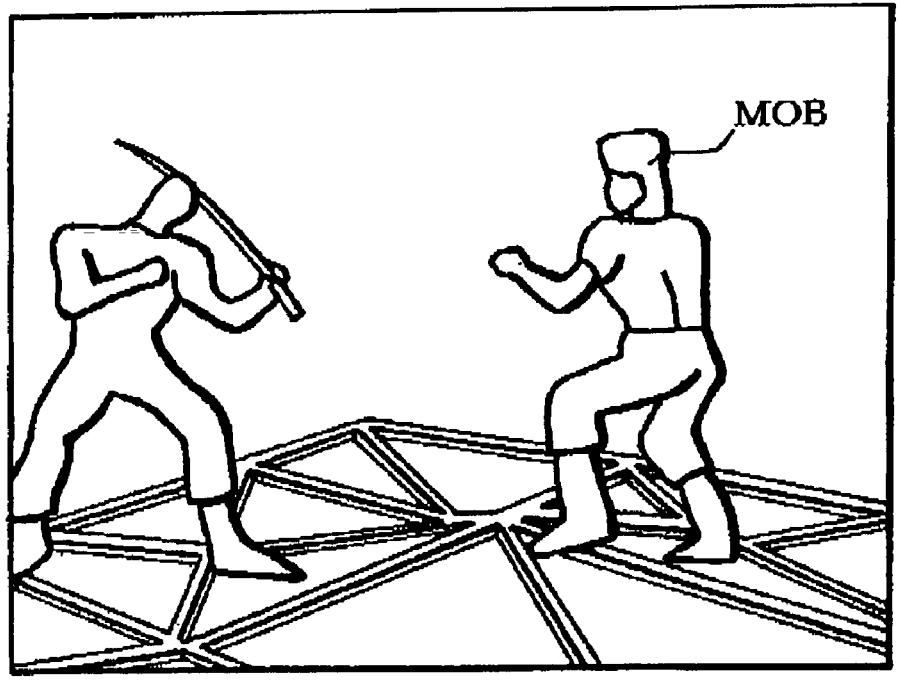
FIGS. 10A and 10B show a further game picture generated in accordance with this embodiment.

FIG. 9A shows a game picture wherein the model object MOB stands on a flat landform surface with both the feet thereof while FIGS. 9B and 10A show another game picture wherein the right and left feet of the model object MOB are in different positions depending on the changed height of the surface of the landform.

Figure 10B:
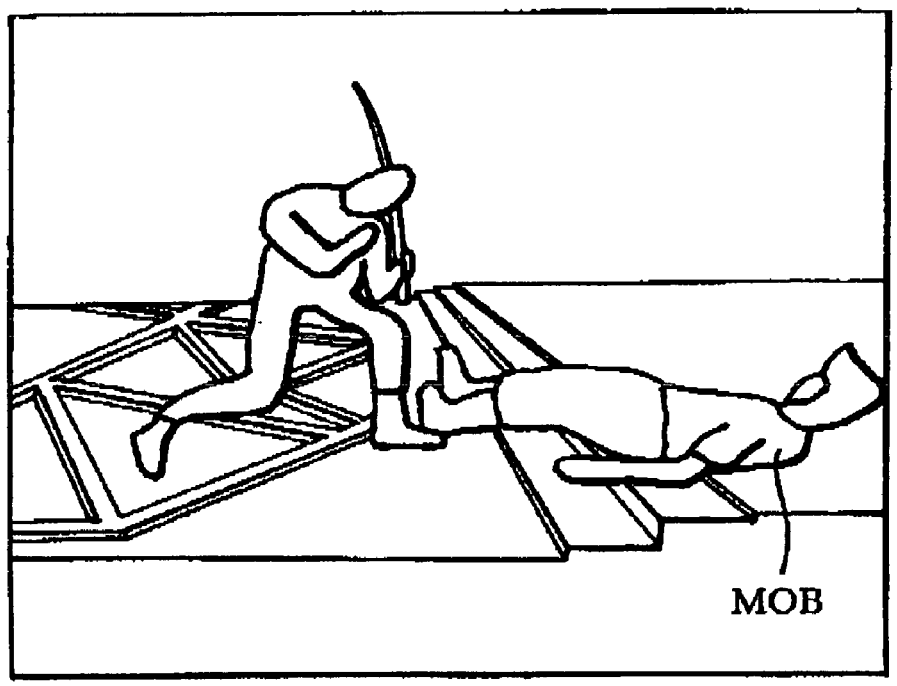
Figure 11A:
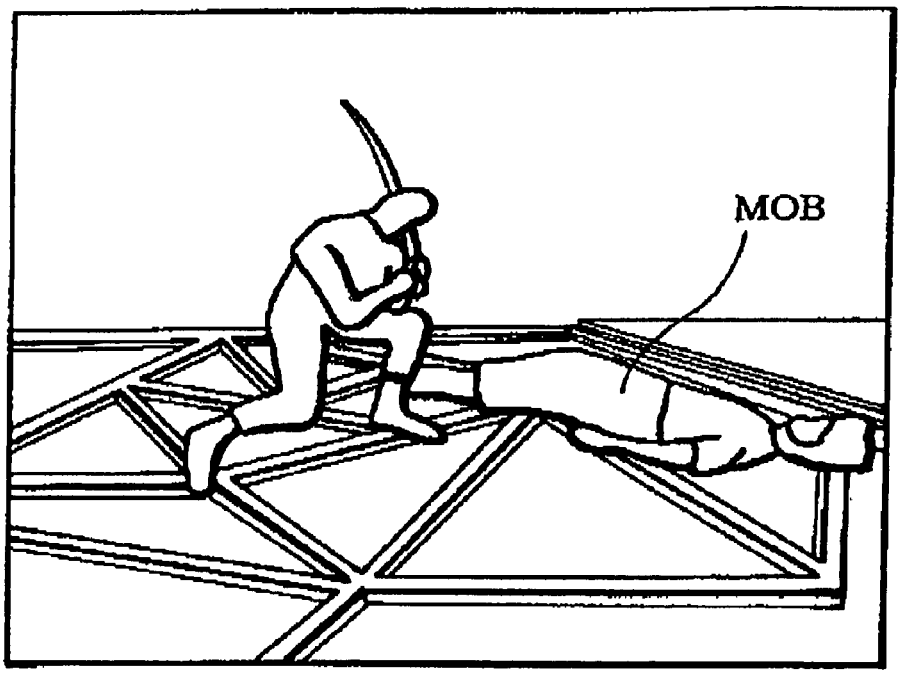
FIGS. 11A and 11B show a further game picture generated in accordance with this embodiment.
Figure 11B:
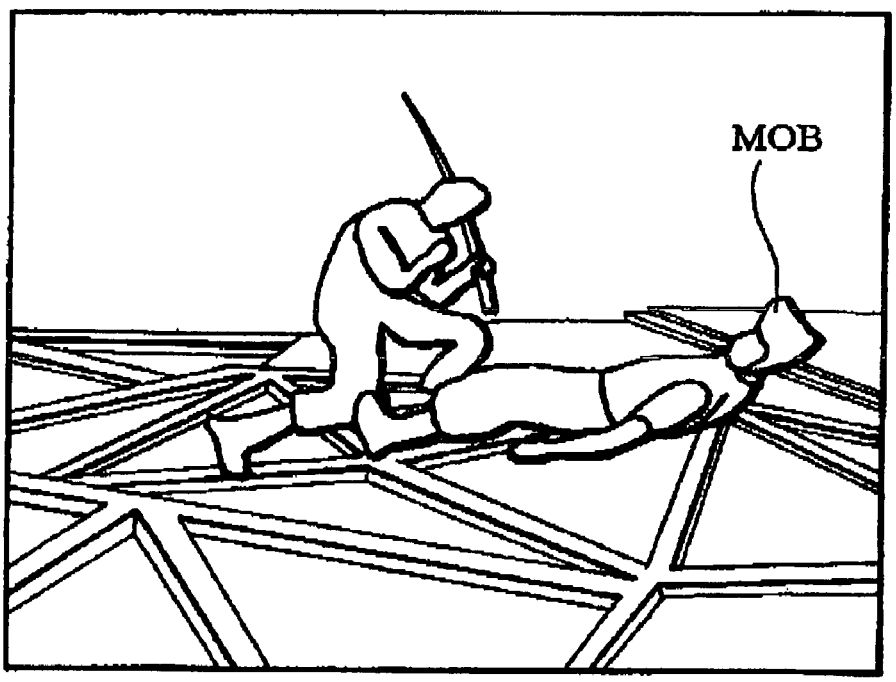

FIG. 10B shows a further game picture wherein the model object MOB lies on a flat landform surface while FIGS. 11A and 11B show still further game picture wherein the upper and lower halves of the model object MOB's body are located in different positions depending on the changed height of the landform.

This embodiment can generate more realistic images by realizing the motion processing of the model object MOB influenced by the shape of the landform, as shown in FIGS. 7A to 11B. This also enables such an undesirable situation that the part objects (feet, hip and so on) of the model object MOB will sink under the surface of the landform (ground) to be avoided, thereby providing a more natural image.

2.3 Jump Processing

This embodiment performs the following processing when the model object is in its jump state (which, in a broad sense, indicates such a state that the model object MOB is moving in the air, for example, if it is bumped off by an attack).

Figure 12A:
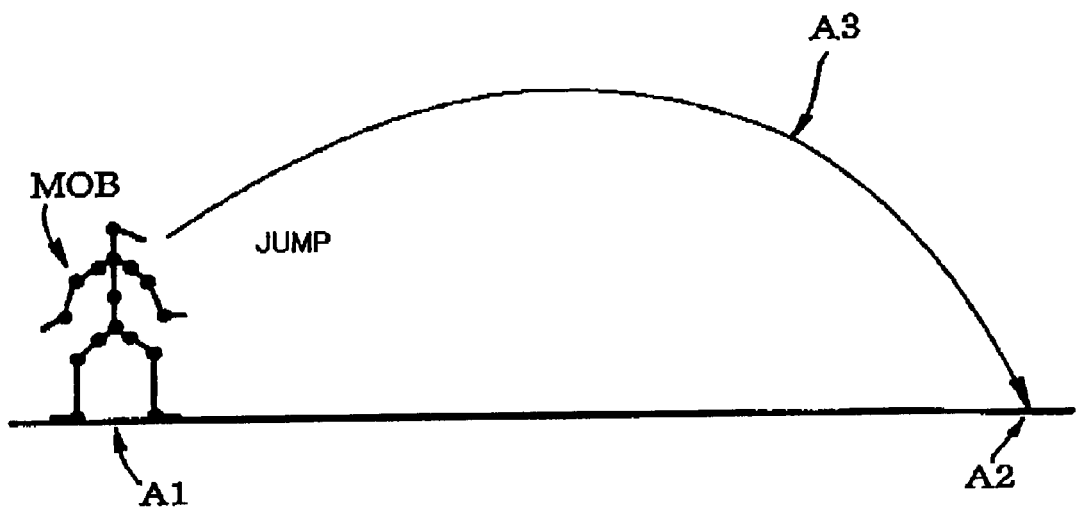
FIGS. 12A and 12B are views illustrating a processing of this embodiment when a model object jumps.

For example, FIG. 12A shows that the model object MOB jumps on a flat landform surface from a point A1 to another point A2.

Figure 12B:
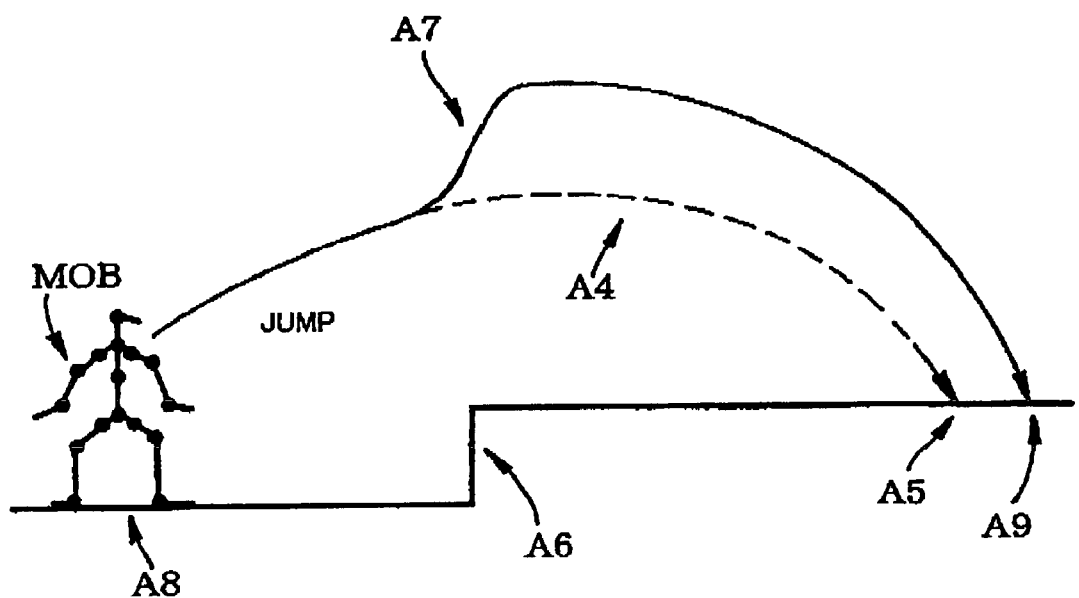

On the other hand, FIG. 12B shows that the model object MOB jumps from the flat landform surface to a raised landform surface.

If the jumping orbit of the model object MOB shown in FIG. 12B is not influenced by the changed height of the landform surface in any way, the jumping orbit of the model object MOB is equal to the orbit A3 of FIG. 12A as shown by A4.

However, the model object MOB jumped along such an orbit A4 will land at a point A5 located shortly from the point A2 of FIG. 12A under the influence of the changed landform height.

In ouch a type of fighting game, the jump motion of the model object MOB had been prepared on the assumption that it always jumps on a flat landform surface. In other words, the prior art provided a jump motion in which the model object MOB begins to jump at the point A1 and lands at the other point A2. Thus, time required to reproduce the jump motion from the point A1 to the other point A2 (or the number of frames) is always invariable irrespectively of the shape of the surface of the and form.

If the model object MOB lands at the point A5 of FIG. 12B, therefore, it will land on the surface of the landform before the model object MOB takes its landing position. This is unnatural.

To overcome such a problem, this embodiment changes the jumping (air movement) orbit depending on the height of the landform (in Y-coordinate specified by X- and Z-coordinates of the representative point in the model object MOB) at a position directly below the model object MOB, even when the model object MOB is in its jumping (air movement) state.

For example, this embodiment may change the jump orbit as shown by A7 in consideration of the raised step as shown by A6 in FIG. 12B. In other words, the jump orbit is raised as the height of the landform increases while the jump orbit is lowered as the height of the landform decreases. Thus, the model object MOB begins to jump at a point AB and lands at a point A9. AS will be apparent from the comparison between the points A2 and A9, the model object MOB can always land substantially at the same point for substantially the same time required to complete the jump. As a result, the motion play of the model object MOB will finish just when it lands at the point A9. so that the model object MOB can take its proper landing attitude.

Furthermore, this embodiment provides a jumping orbit smoothly changed as shown by A7 even though the height of the landform suddenly changes as shown by A6. This may be accomplished by changing the height of the jumping orbit in the model object MOB with a rate of change lower than that in the height of the landform.

Figure 13A:
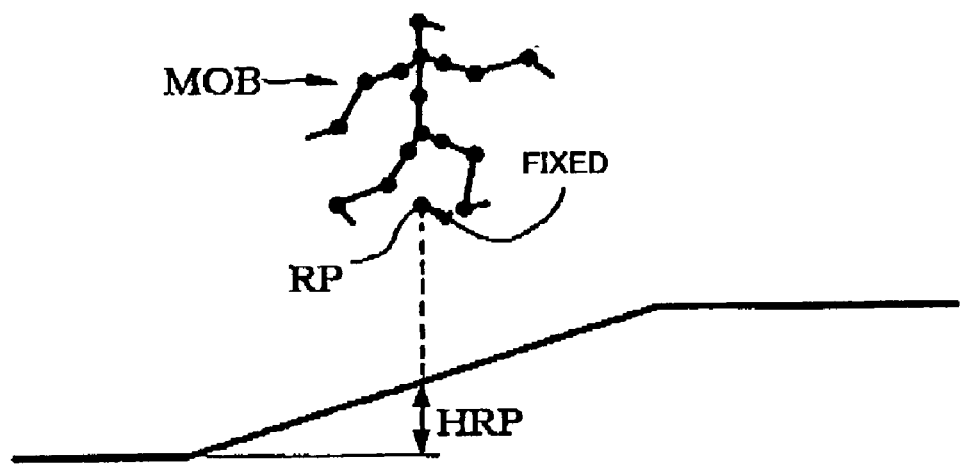
FIGS. 13A and 13B are views illustrating another processing of this embodiment when a model object jumps.

Furthermore, this embodiment fixes a judgment point for determining the disposing height of the model object MOB at the representative point RP of the same as the model object MOB is in its jump (or air movement) state, as shown in FIG. 13A. The jumping orbit is changed by changing the disposing height of the model object MOB depending on the height of the landform (in Y-coordinate specified by the X- and Z-coordinates of the representative point RP) at a position directly below the representative point RP (see FIG. 12B).

Figure 13B:
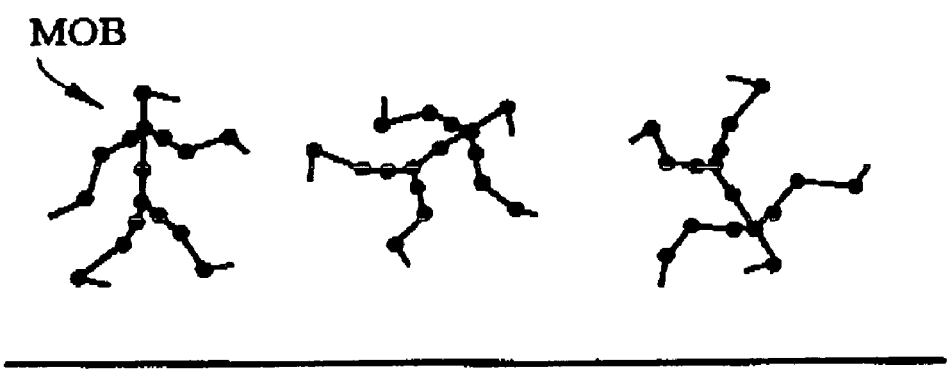

In such a type of fighting game, the model object MOB (character) may perform a motion wherein it jumps while rotating the body as shown in FIG. 13B. If, in such a case, the position of a part object to be located on a lower surface of the landform (right foot) is set as a judgment point for the disposing height of the model object MOB (or a point for reading out the height of the landform) as shown in FIGS. 4A to 4D, the judgment point will be changed as the model object MOB is rotated. This renders the process complicated.

This embodiment fixes the judgment point for the disposing height of the model object MOB at the representative point RP of the model object MOB when it is in its jump state, as shown in FIG. 13A. Even when the model object MOB executes such a rotation-jump motion as shown in FIG. 13B, therefore, the judgment point will not be changed, thereby simplifying the processes. In addition, the model object MOB can land even on any uneven landform with a proper landing attitude, since the jumping orbit of the model object MOB is changed depending on the height of the landform at the position of the representative point RP being this judgment point.

2.4 Control of the Rate of Height Change

As described, this embodiment can move the model object MOB along the shape of the landform by changing the disposing height of the model object to be disposed MOB depending on the height of the landform.

In such a case, however, any unnatural image may be generated if the disposing height of the model object MOB is changed with the same rate of change as that for the height of the landform. For example, when the landform has a sudden step as shown by B1 in FIG. 14A and if the disposing height of the model object MOB is changed with the same rate of change as that for the height of this step, the disposing height of the model object MOB will also be suddenly changed near the step as shown by B2. This renders the movement orbit of the model object MOB unnatural.

Figure 14A:
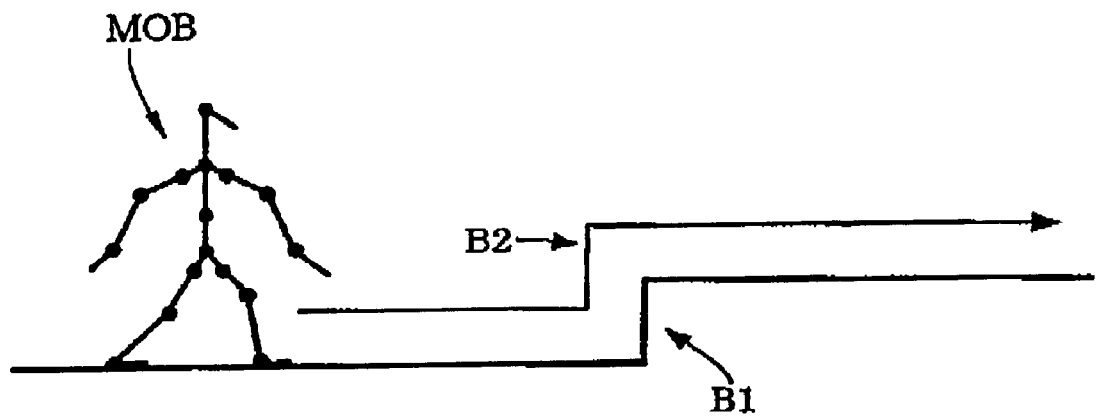
FIGS. 14A, 14B and 14C are views illustrating a technique of setting a rate of change in the level of a model object lower than that in the height of a landform.

To overcome such a problem, this embodiment changes the disposing height of the model object MOB (or attenuates the change of the height) with a rate of change lower than the rate of change for the height of the landform (or change of height for one frame). Even though there is such a step as shown by FIG. 14B or 14C at B3 or B4, the movement orbit of the model object MOB can be smoothened to provide a more natural image, as shown by B5, B6.

Figure 14B:
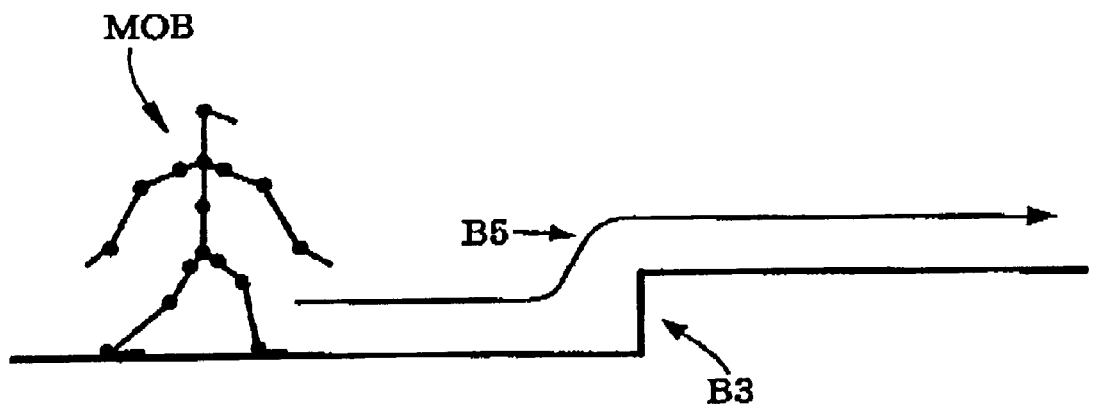
Figure 14C:
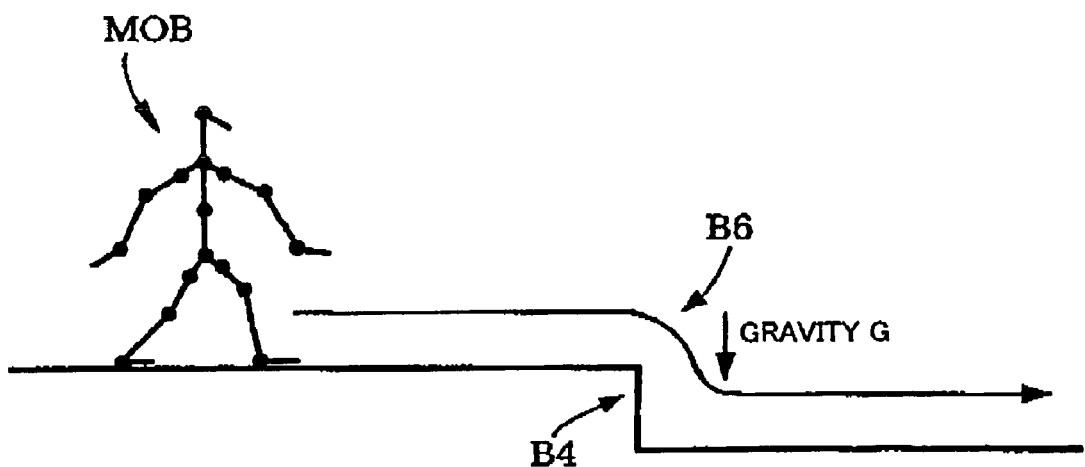

For example, if the height of the landform is changed in a direction wherein it increases as shown by B3 in FIG. 14B, the height offset HOFF of the model object MOB (or the amount of movement of the temporarily model object to be disposed MOB in the height direction) can be determined by the following formula:

$$HOFF=(1-\beta)\times HK+\beta\times HL \quad (3)$$

where HK is the height of the landform in the previous frame; HL is the height of the landform in the present frame; and β (0<β<1) is a rate of blend for HK and HL. Thus, the height offset HOFF not exceeding HL can be added into the disposing height of the model object MOB. This enables the disposing height of the model object MOB to be changed with the rate of change (HOFF) lower than the rate of change (HL–HK) for the height of the landform.

On the other hand, if the height of the landform is changed in a direction wherein it decreases as shown by B4 in FIG. 14C, the height offset HOFF of the model object MOB can be determined by the following formula:

$$HOFF=HK+VH(G) \quad (4)$$

where HOFF is restricted to be HOFF<HL.

In the above formula, VH (G) represents the velocity in the height direction accelerated by gravity G and will increase through subsequent addition of gravity G as time (frame) required to descend the landform increases. This can represent such a state that the model object MOB falls while being accelerated under the gravity G (e.g., that the model object MOB descends on a tilted road). This can improve the reality in the generated image. Since the upper limit of HOFF is restricted at HL, the disposing height of the model object MOB can be changed with the rate of change lower than that for the height of the landform.

2.5 Adjustment of Hip Height

Figure 15A:
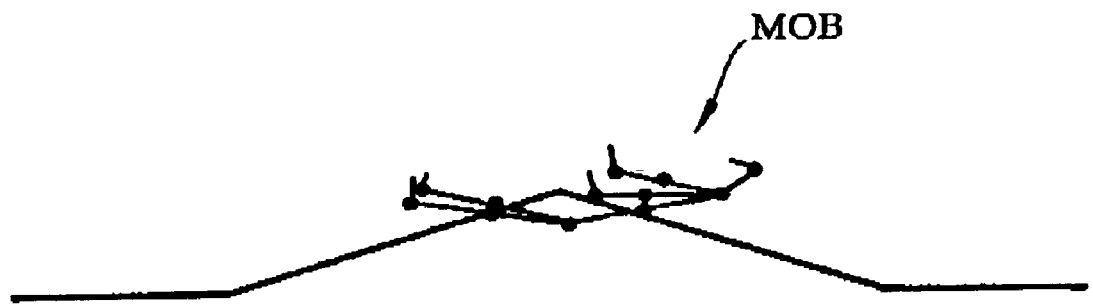
FIGS. 15A, 15B and 15C are views illustrating a technique of preventing the hip part object of a model object from sinking under the surface of the landform.

In such a type of fighting game, the model object MOB lies (or falls down) as shown in FIGS. 10*a*, 11A and 11B. Even if the position of the model object MOB is determined based on the positions of the feet or others thereof through such a technique as described in connection with FIGS. 4A to 4D in the above-mentioned case, the hip of the model object MOB may sink under the surface of the landform as shown in FIG. 15A.

Figure 15B:
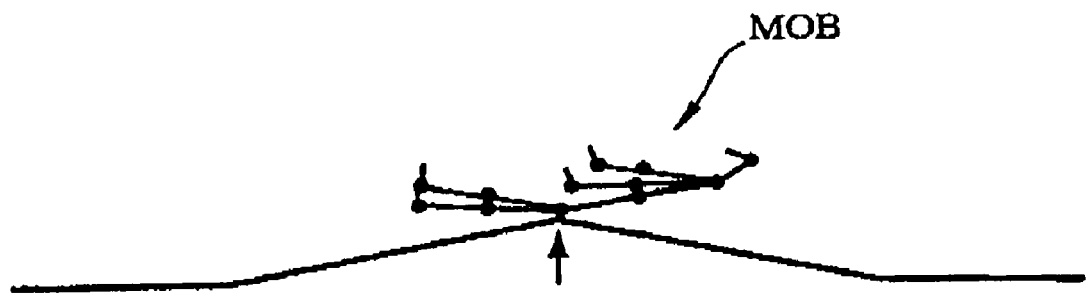

To avoid such a situation, this embodiment takes a technique of increasing the disposing height of the model object MOB (height offset). In other words, the disposing height of the model object MOB is increased such that the hip part object (hip joint) is brought into contact with the surface of the landform as shown in FIG. 15B if the hip part object of the model object MOB sinks under the surface of the landform as shown in FIG. 15A when the model object MOB is disposed at the height determined based on the height of the landform. This prevents the hip part object from sinking under the surface of the landform.

In this case, however, the positions of the hands, feet and head will also correspondingly be raised as shown in FIG. 15B merely by simply increasing the entire disposing height of the model object. This will make the hands, feet and head in a floating fashion.

Figure 15C:
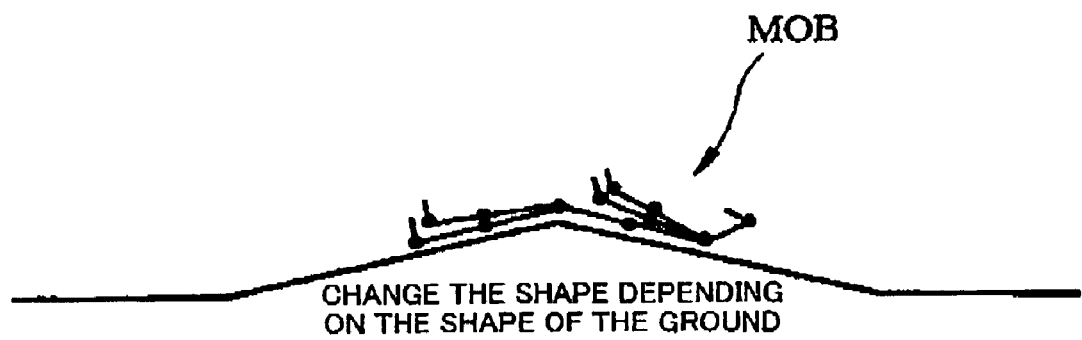

Thus, this embodiment takes a further technique of changing the shape of the model object MOB such that the part objects (such as hands, feet and head) other than the hip part object are lower in height than the hip part object. More particularly, the shape of the model object MOB is changed depending on the shape of the ground, as shown in FIG. 15C. Thus, the part objects such as hands, feet and head can be brought into contact with the surface of the landform.

In such a manner, this embodiment can prevent the hip of the model object MOB from sinking under the surface of the landform as shown in FIGS. 11A and 11B and can change the model object MOB such that the shape of the lying model object MOB fits in the shape of the landform surface. Therefore, this embodiment can generate a more natural image.

3. Processing in this Embodiment

Figure 16:
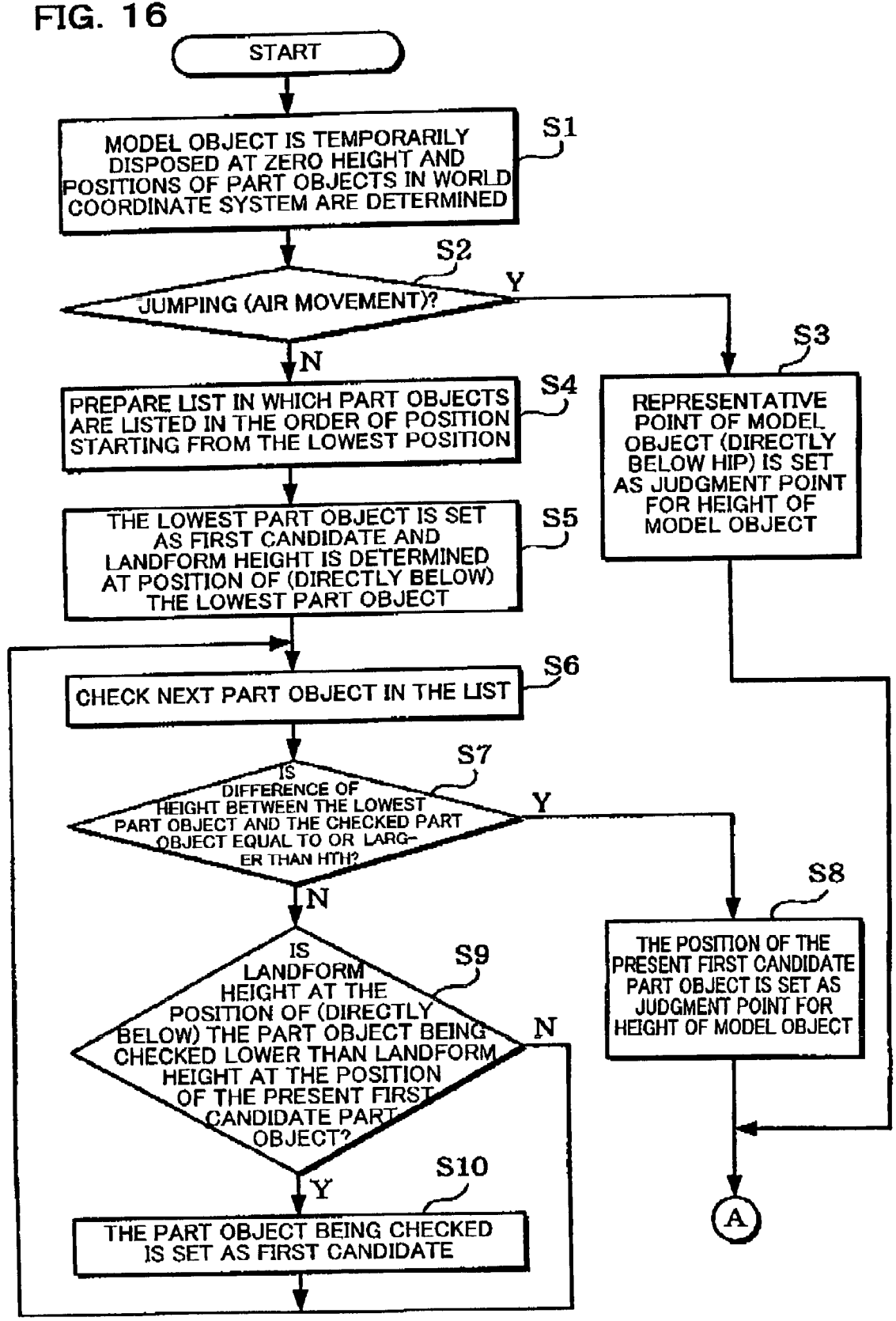
FIG. 16 is a flowchart illustrating the details of a processing in this embodiment.
Figure 17:
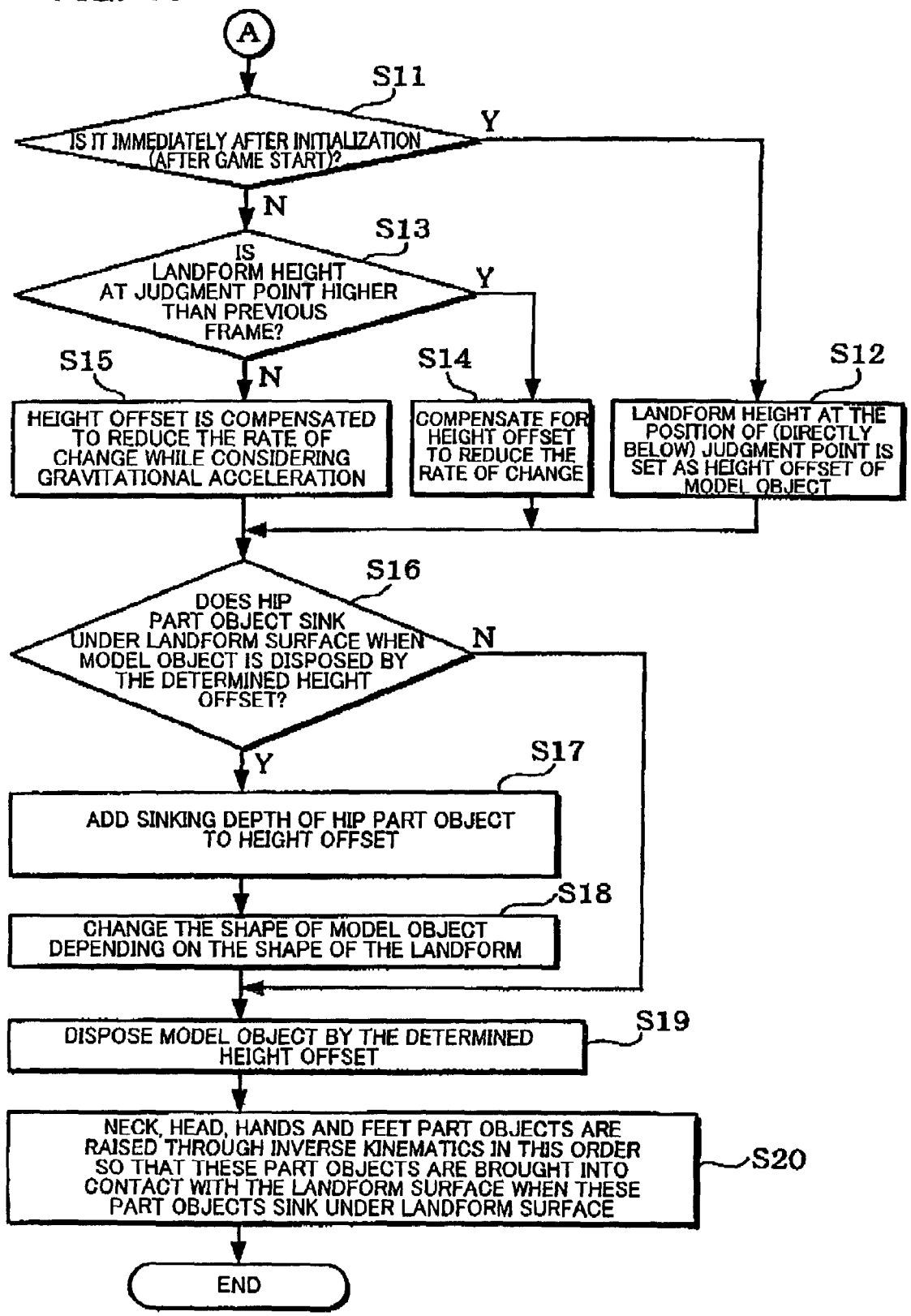
FIG. 17 is a flowchart illustrating the continuation of the processing shown in FIG. 16.

The details of the processing according to this embodiment will be described with respect to the flowcharts shown in FIGS. 16 and 17.

First of all, a model object having its shape specified by the motion data is temporarily disposes at a position wherein the height thereof is equal to zero. The positions (and directions) of the respective part objects (including bones and articulations) in the world cooperate system are then determined (step S1, see FIG. 4A). More particularly, X- and Z-coordinates XL, ZL of the model object (or representative point) belonging to the present frame in the world coordinate system, based on the position of the model object in the previous frame and the operational data inputted by a player. The model object (or representative point) is temporarily disposed at a position (XL, 0, ZL). Based on such a position as well as the motion data, the positions of the respective part objects in the world coordinate system are then determined.

Next, it is judged whether or not the model object is in its jump (or air movement) state (step S2). If the model object is in its jump state, the representative point of the model object (which is located directly below the hip) is set at a judgment point for the disposing height of the model object (center of gravity) (step S3, see FIG. 13A).

If the model object is not in its jumping state, a list wherein the part objects are listed in the order of height starting from the lowest height is prepared (step S4). One of the part objects having its lowest position in the list is set as a first candidate while the height of the landform at a position directly below that part object is determined (step S5, see FIG. 4B).

Next, the subsequent part object is checked in the list (step S6). It is then judged whether or not the difference of height between the checked part object and the lowest part object is equal to or larger than HTH (step S7, see FIG. 4B). If it is equal to or larger than HTH, the position of the present first candidate part object (articulation) is set at a judgment point for the disposing height of the model object (step S8). If the difference of height is smaller than HTH, it is judged whether or not the height of the landform at the position directly below the part object being checked is lower than the height of the landform at the position of the present first candidate part object (step S9). If not so, the part object being checked is set as another first candidate (step S10). The procedure then returns to the step S6. If the height of the landform at the position of the part object being checked is higher than the height of the landform at the position of the present first candidate part object, the procedure returns to the step S6 without changing the present first candidate.

After the judgment point has been set in the step 83 or S8, it is judged whether the present frame is immediately after the initialization (game start) (step S11). if so, the height of the landform at the position directly below the judgment point set in the step S3 or S8 is directly set as a height offset in the model object (step S12).

If not immediately after the initialization, it is judged whether or not the height of the landform (height offset) at the judgment point in the present frame is larger than the height in the previous frame (step S13). if so, the height offset is compensated for such that the rate of change thereof is reduced (step S14, see FIG. 14A). If not so, the height offset is compensated for to reduce the rate of change thereof while taking the gravitational acceleration into consideration (step S15, see 14C).

If the model object is disposed at the determined height offset, it is judged whether or not the hip part object sinks under the surface of the landform (step S16, see FIG. 15A). If the hip part object sinks under the surface of the landform, the height of the hip part object sinking under the surface of the landform is added into the height offset (step S11, see FIG. 15B). The shape of the model object is then changed depending on the shape of the ground (step S18, see FIG. 15C).

The model object is then disposed at the determined height offset (step S19). If the part objects of neck, head, hands and feet sink under the surface of the landform at this time, the neck, head, hands and feet are forced up through the inverse kinematics such that these part objects will be brought into contact with the surface of the landform (step S20, see FIG. 4D). More particularly, it is first judged whether or not the neck sinks under the surface of the landform. If the neck sinks under the surface of the landform, the neck will be forced up. It is then judged whether or not the head sinks under the surface of the landform. If the head sinks under the surface of the landform, the head will be forced up. It is then judged whether or not the hands sink under the surface of the landform. If the hands sink under the surface of the landform, the hands will be forced up. It is then judged whether or not the feet sink under the surface of the landform. If the feet sink under the surface of the landform, the feet will be forced up.

Thus, the motion shape of the model object can be changed to fit in the shape of the landform, thereby providing a more natural image.

4. Hardware Configuration

Figure 18:
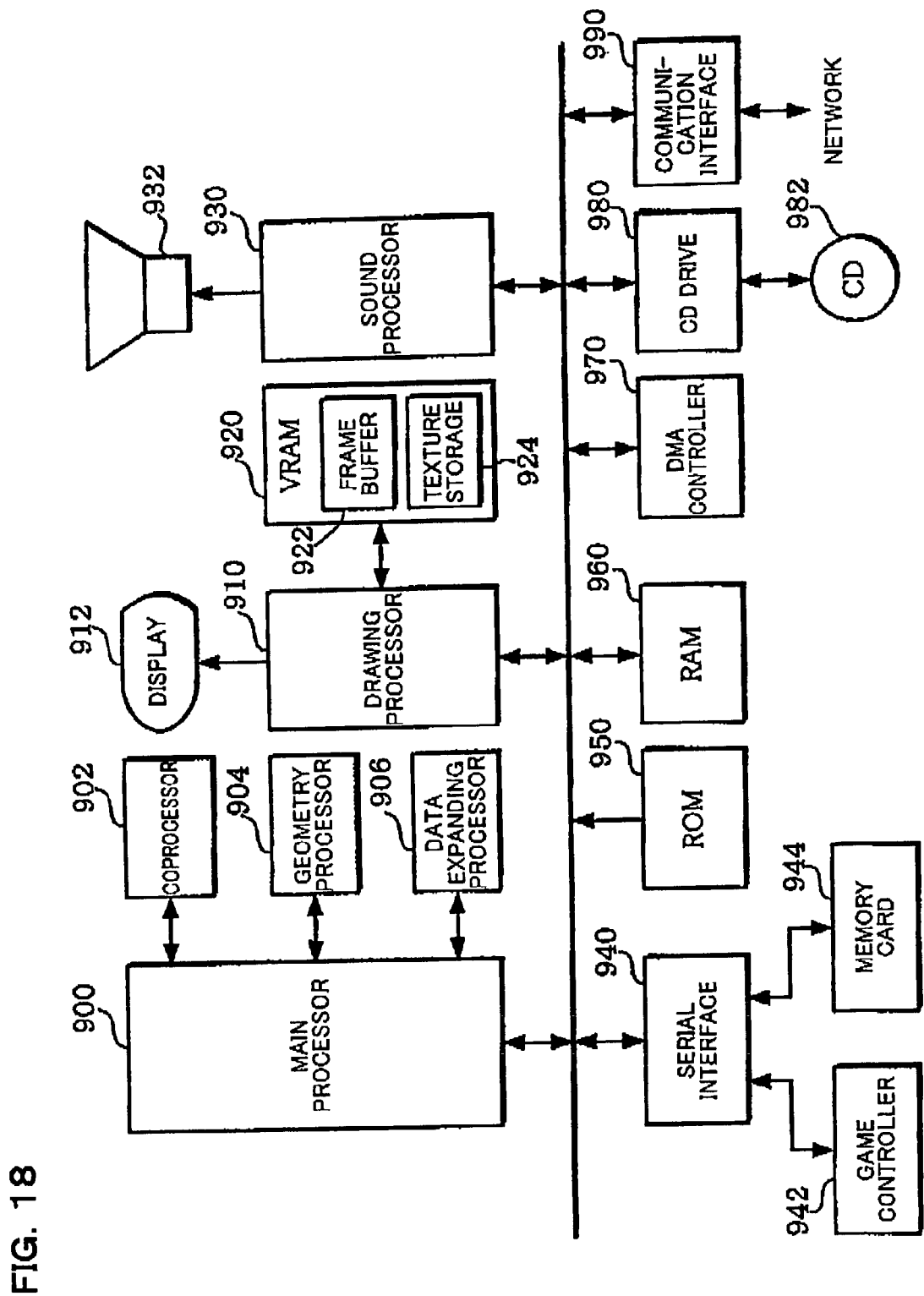
FIG. 18 shows a hardware structure capable of realizing this embodiment.

A hardware arrangement which can realize this embodiment is shown in FIG. 18.

A main processor 900 operates to execute various processing& such as game processing, image processing, sound processing and other processings according to a program stored in a CD (information storage medium) 982, a program transferred through a communication interface 990 or a program stored in a ROM (one information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to perform its movement or action (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation may be displayed. The image and sound data to be decoded may be stored in the storage devices including ROM 950 and CD 982 or may externally be transferred through the communication interface 990.

A drawing processor 910 is to draw or render an object constructed by primitives (primitive faces) such as polygons or curved faces at high speed. On drawing of the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942 such as a lever, button, housing, pad-type controller or gun-type controller, saved data from a memory card 944 and personal data may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMs, VRAMs, ROMs or the like).

CD drive 980 drives a CD (information storage medium) 982 in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other game system.

All the means of the present invention may be executed only through hardware or only through a program which has been stored in an information storage medium or which is distributed through the communication interface. Alternatively, they may be executed both through the hardware and program.

If all the means of the present invention are executed both through the hardware and program, the information storage medium will have stored a program for executing the respective procedures of the present invention through hardware (or computer). More particularly, the aforementioned program instructs the respective processors 902, 904, 906, 910 and 930 which are hardware and also delivers the data to them, if necessary. Each of the processors 902, 904, 906, 910 and 930 will execute the corresponding one of the procedures of the present invention based on the instruction and delivered data.

Figure 19A:
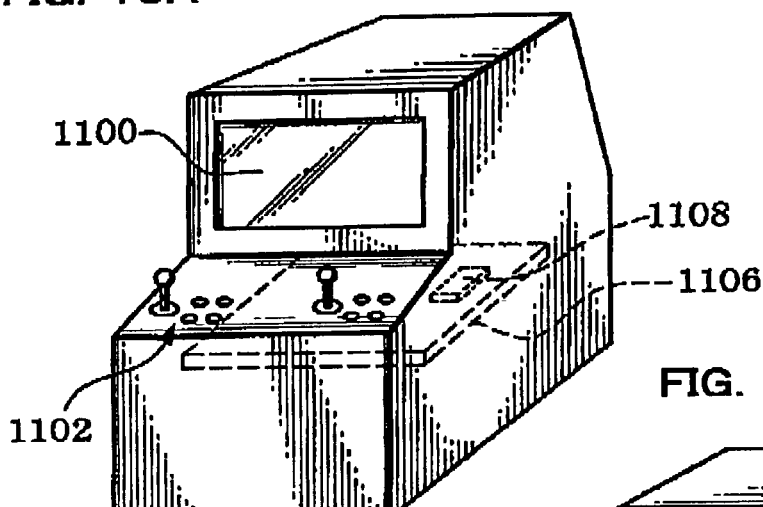
FIGS. 19A, 19B and 19C show various system forms to which this embodiment can be applied.

FIG. 19A shows an arcade game system (or image generating system) to which this embodiment is applied. Players enjoy a game by controlling levers 1102 and others while viewing a game scene displayed on a display 1100. A system board (circuit board) 1106 included in the game system includes various processor and memories which are mounted thereon. The program (or data) for executing the respective procedures of the present invention has been stored in a memory 1108 on the system board 1106, which is an information storage medium. Such information will be referred to "stored program (or stored information)" later.

Figure 19B:
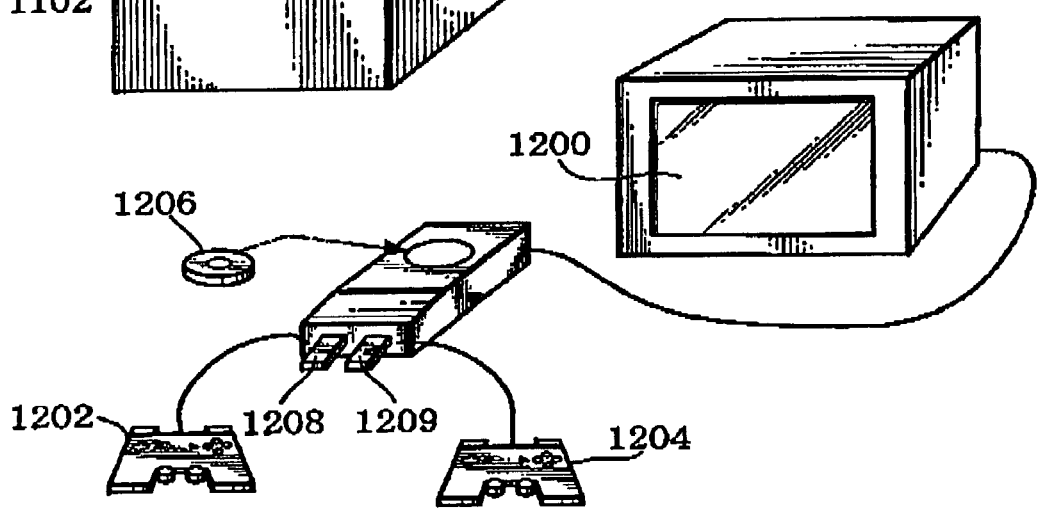

FIG. 19B shows a home game system (or image generating system) to which this embodiment is applied. A player enjoys a game by manipulating game controllers 1202 and 1204 while viewing a game picture displayed on a display 1200. In such a case, the aforementioned stored program (or stored information) has been stored in CD 1206 or memory cards 1208, 1209 which are detachable information storage media in the game system body.

Figure 19C:
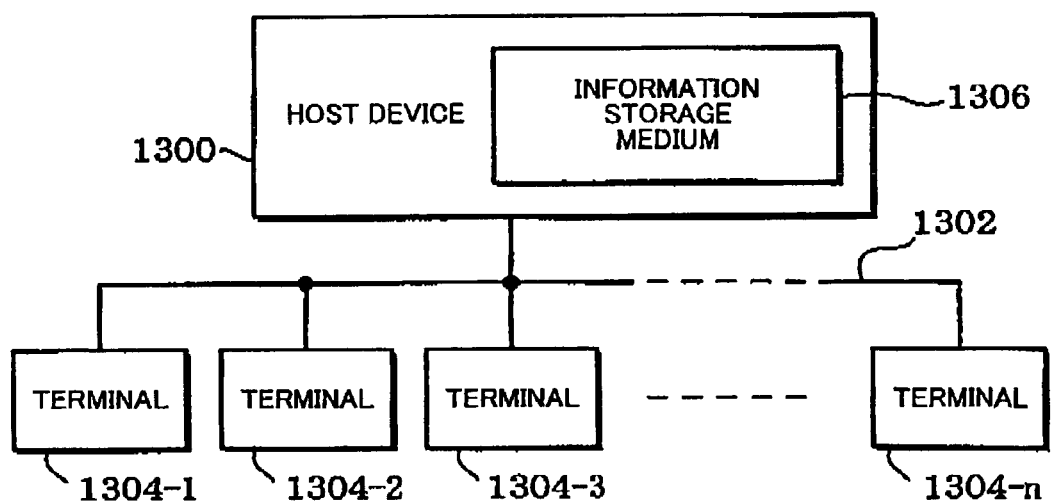

FIG. 19C shows an example wherein this embodiment is applied to a game system which includes a host device 1300 and terminals 1304-1 to 1304-n (game machines or portable telephones) connected to the host device 1300 through a network (which is a small-scale network such as LAN or a global network such as INTERNET) 1302. In such a case, the above stored program (or stored information) has been stored in an information storage medium 1306 such as magnetic disk device, magnetic tape device, memory or the like which can be controlled by the host device 1300, for example. If each of the terminals 1304-1 to 1304-n are designed to generate game images and game sounds in a stand-alone manner, the host device 1300 delivers the game program and others necessary for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 19C, the respective procedures of the present invention may be decentralized into the host device (or server) and terminals. The above stored program (or stored information) for realizing the respective procedures of the present invention may be distributed and stored into the information storage media of the host device (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the matters described in connection with the above forms, but may be carried out in any of various other forms.

For example, the technique of changing the shape of the model object is not limited to such a technique as described in connection with this embodiment, but may be any of various other techniques using the known inverse kinematics or the like.

The technique of changing the disposing height of the model object to be disposed depending on the height of the landform is not also limited to such a technique as described in connection with this embodiment, but may be any of various other techniques.

The invention relating to one of the dependent claims may not contain part of the structural requirements in any claim to which the one dependent claim belongs. The primary part of the invention defined by one of the independent claims may belong to any other independent claim.

The present invention may be applied to any of various games such as fighting games, shooting games, robot combat games, sports games, competitive games, roll-playing games, music playing games, dancing games and so on.

Furthermore, the present invention can be applied to various image generating systems (or game systems) such as arcade game systems, home game systems, large-scaled multi-player attraction systems, simulators, multimedia terminals, image generating systems, game image generating system boards and so on.

What is claimed is:

1. A method of generating an image, comprising:
   performing a motion processing which causes a model object to perform a motion, the model object being formed of part objects;
   selecting a part object among the part objects;
   disposing the model object at such a height that the selected part object is in contact with a surface of a landform;
   changing a shape of the model object specified by the motion processing depending on a shape of an uneven landform; and
   generating an image within an object space at a given viewpoint.

2. The method as defined by claim 1, further comprising:
   disposing the model object at such a height that one part object to be located on a lower surface of the landform among the part objects is in contact with the surface of the landform, and changing the shape of the model object so that another of the part objects is brought into contact with the surface of the landform when the other of the part objects sinks under the surface of the landform due to the disposition of the model object.

3. The method as defined by claim 2, further comprising:
   selecting candidate part objects among the part objects within a given range of height from a part object located at the lowest position in the shape of the model object specified by the motion processing, and disposing the model object at such a height that one of the selected candidate part objects to be located on a lowest surface of the landform is in contact with the surface of the landform.

4. The method as defined by claim 1 further comprising:
   changing a disposing height of the model object depending on a height of the landform; and changing an orbit of air movement depending on the height of the landform at a position of the model object even when the model object is in an air moving state.

5. The method as defined by claim 1, further comprising:
changing a disposing height of the model object depending on a height of the landform;
changing the disposing height of the model object depending on the height of the landform at a position in which a part object is disposed when the model object is in a normal moving state in which the model object is moving with the part object in contact with a surface of the landform; and
fixing a judgment point for determining the disposing height of the model object at a representative point of the model object when the model object is in an air moving state, and changing the disposing height of the model object depending on the height of the landform at a position of the representative point.

6. The method as defined by claim 1, further comprising:
changing a disposing height of the model object depending on a height of the landform; and
changing the disposing height of the model object with a rate of change lower than a rate of change for height of the landform.

7. The method as defined by claim 1,
wherein the model object is a character in a game,
the method further comprises:
changing a disposing height of the model object depending on a height of the landform; and
increasing the disposing height of the model object so that a hip part object of the model object is brought into contact with the surface of the landform when the model object is disposed at a height obtained based on the height of the landform and the hip part object sinks under the surface of the landform.

8. The method as defined by claim 7, further comprising changing the shape of the model object so that a height of the part objects other than the hip part object are lower than a height of the hip part object.

9. A method of generating an image, comprising:
changing a disposing height of a model object depending on a height of a landform;
performing a motion processing which causes the model object to perform a motion;
generating an image within an object space at a given viewpoint; and
changing an orbit of air movement depending on the height of the landform at a position of the model object even when the model object is in an air moving state;
wherein a time required to complete the orbit after changing the orbit is dependent upon the time required to complete the orbit had the orbit not been changed.

10. A method of generating an image, comprising:
changing a disposing height of a model object depending on a height of a landform;
performing a motion processing which causes the model object to perform a motion;
generating an image within an object space at a given viewpoint;
changing the disposing height of the model object depending on the height of the landform at a position in which a part object is disposed when the model object is in a normal moving state in which the model object is moving with the part object in contact with a surface of the landform; and
fixing a judgment point for determining the disposing height of the model object at a representative point of the model object when the model object is in an air moving state, and changing the disposing height of the model object depending on the height of the landform at a position of the representative point.

11. A program recorded on a computer readable information storage medium for a computer to realize:
a motion processing which causes a model object to perform a motion, the model object being formed of part objects;
a processing which selects a part object among the part objects;
a processing which disposes the model object at such a height that the part object is in contact with a surface of a landform;
a processing which changes a shape of the model object specified by the motion processing depending on a shape of an uneven landform; and
a processing which generates an image within an object space at a given viewpoint.

12. The program as defined by claim 11,
wherein the model object is disposed at such a height that one part object to be located on a lower surface of the landform among the part objects is in contact with the surface of the landform, and the shape of the model object is changed so that another of the part objects is brought into contact with the surface of the landform when the other of the part objects sinks under the surface of the landform due to the disposition of the model object.

13. The program as defined by claim 12,
wherein candidate part objects are selected among the part objects within a given range of height from a part object located at the lowest position in the shape of the model object specified by the motion processing, and the model object is disposed at such a height that one of the selected candidate part objects to be located on a lowest surface of the landform is in contact with the surface of the landform.

14. The program as defined by claim 11,
wherein a disposing height of the model object is changed depending on a height of the landform, and
wherein an orbit of air movement is changed depending on the height of the landform at a position of the model object even when the model object is in an air moving state.

15. The program as defined by claim 11,
wherein a disposing height of the model object is changed depending on a height of the landform,
wherein the disposing height of the model object is changed depending on the height of the landform at a position in which a part object is disposed when the model object is in a normal moving state in which the model object is moving with the part object in contact with a surface of the landform, and
wherein a judgment point for determining the disposing height of the model object is fixed at a representative point of the model object when the model object is in an air moving state, and changing the disposing height of the model object depending on the height of the landform at a position of the representative point.

16. The program as defined by claim 11,
wherein a disposing height of the model object is changed depending on a height of the landform, and
wherein the disposing height of the model object is changed with a rate of change lower than a rate of change for height of the landform.

17. The program as defined by claim 11,
wherein the model object is a character in a game,
wherein a disposing height of the model object is changed depending on a height of the landform, and
wherein the disposing height of the model object is increased so that a hip part object of the model object is brought into contact with the surface of the landform when the model object is disposed at a height obtained based on the height of the landform and the hip part object sinks under the surface of the landform.

18. The program as defined by claim 17,
wherein the shape of the model object is changed so that a height of the part objects other than the hip part object are lower than a height of the hip part object.

19. A program recorded on a computer readable information storage medium for a computer to realize:
a processing which changes a disposing height of a model object depending on a height of a landform;
a motion processing which causes the model object to perform a motion: and
a processing which generates an image within an object space at a given viewpoint,
wherein an orbit of air movement is changed depending on the height of the landform at a position of the model object even when the model object is in an air moving state; and
wherein a time required to complete the orbit after changing the orbit is dependent upon the time required to complete the orbit had the orbit not been changed.

20. A program recorded on a computer readable information storage medium for a computer to realize:
a processing which changes a disposing height of a model object depending on a height of a landform;
a motion processing which causes the model object to perform a motion: and
a processing which generates an image within an object space at a given viewpoint,
wherein the disposing height of the model object is changed depending on the height of the landform at a position in which a part object is disposed when the model object is in a normal moving state in which the model object is moving with the part object in contact with a surface of the landform, and
wherein a judgment point for determining the disposing height of the model object is fixed at a representative point of the model object when the model object is in an air moving state, and changing the disposing height of the model object depending on the height of the landform at a position of the representative point.

* * * * *